(12) United States Patent
Rosenflanz et al.

(10) Patent No.: US 7,168,267 B2
(45) Date of Patent: Jan. 30, 2007

(54) METHOD OF MAKING AMORPHOUS MATERIALS AND CERAMICS

(75) Inventors: Anatoly Z. Rosenflanz, Maplewood, MN (US); Ahmet Celikkaya, Woodbury, MN (US); Thomas J. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 97 days.

(21) Appl. No.: 10/211,639

(22) Filed: Aug. 2, 2002

(65) Prior Publication Data

US 2003/0110709 A1 Jun. 19, 2003

Related U.S. Application Data

(63) Continuation-in-part of application No. 09/992,526, filed on Aug. 2, 2001, now abandoned, and a continuation-in-part of application No. 09/992,527, filed on Aug. 2, 2001, now abandoned, and a continuation-in-part of application No. 09/922,528, filed on Aug. 2, 2001, now abandoned, and a continuation-in-part of application No. 09/922,530, filed on Aug. 2, 2001, now abandoned.

(51) Int. Cl.
*C03C 9/03* (2006.01)

(52) U.S. Cl. ............... 65/21.1; 264/319; 264/332; 432/13

(58) Field of Classification Search ........... 264/319, 264/332; 432/13; 65/21.1
See application file for complete search history.

(56) References Cited

U.S. PATENT DOCUMENTS

| 659,926 A | 10/1900 | Jacobs |
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |

(Continued)

FOREIGN PATENT DOCUMENTS

| AT | 333146 | 11/1976 |
| DE | 20 34 011 | 7/1970 |
| DE | 134 638 A | 3/1979 |
| DE | 141 420 | 4/1980 |
| EP | 0 200 487 | 11/1986 |

(Continued)

OTHER PUBLICATIONS

English abstract of SU 1455569 filed Jul. 27, 1996.*
Aasland and McMillan, Nature 369, 633 (1994).
Aguilar et al, "Melt Extraction Processing of Structural $Y_2O_3$-$Al_2O_3$ Fibers", J. Eur. Ceram. Soc. 20 1091-1098 (2000).
Gandhi, A.S. and Jarayam, V., "Pressure Consolidation of Amorphous $ZrO_2$-$Al_2O_3$ by Plastic Deformation of Powder Particles", Acta Materiala, 50 (2002), 2137-2149.

(Continued)

*Primary Examiner*—Archene Turner

(57) ABSTRACT

Methods of making amorphous material and ceramic materials. Embodiments of the invention can be used to make abrasive particles. The abrasive particles can be incorporated into a variety of abrasive articles, including bonded abrasives, coated abrasives, nonwoven abrasives, and abrasive brushes.

62 Claims, 1 Drawing Sheet

U.S. PATENT DOCUMENTS

| | | |
|---|---|---|
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,206,081 A | 7/1940 | Eberlin |
| 2,424,645 A | 7/1947 | Baumann, Jr. et al. |
| 2,618,567 A | 11/1952 | Comstock, III |
| 2,805,166 A | 9/1957 | Loffler |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,174,871 A | 3/1965 | Geffcken et al. |
| 3,181,939 A | 5/1965 | Marshall et al. |
| 3,216,794 A | 11/1965 | Roschuk |
| 3,377,660 A | 4/1968 | Marshall et al. |
| 3,498,769 A | 3/1970 | Coes, Jr. |
| 3,625,717 A | 12/1971 | Grubba et al. |
| 3,635,739 A | 1/1972 | Macdowell et al. |
| 3,637,361 A | 1/1972 | Kita et al. |
| 3,646,713 A | 3/1972 | Marshall et al. |
| 3,650,780 A | 3/1972 | Connelly |
| 3,714,059 A | 1/1973 | Shaw et al. |
| 3,717,583 A | 2/1973 | Shaw et al. |
| 3,726,621 A | 4/1973 | Cichy |
| 3,754,978 A | 8/1973 | Elmer et al. |
| 3,781,172 A | 12/1973 | Pett et al. |
| 3,792,553 A | 2/1974 | Schleifer et al. |
| 3,859,407 A | 1/1975 | Blanding et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |
| 3,926,603 A | 12/1975 | Plesslinger et al. |
| 3,928,515 A | 12/1975 | Richmond et al. |
| 3,940,276 A | 2/1976 | Wilson |
| 3,947,281 A | 3/1976 | Bacon |
| 3,973,977 A | 8/1976 | Wilson |
| 3,996,702 A | 12/1976 | Leahy |
| 4,014,122 A | 3/1977 | Woods |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |
| 4,111,707 A | 9/1978 | Komorita et al. |
| 4,126,429 A | 11/1978 | Watson |
| 4,140,494 A | 2/1979 | Coes, Jr. |
| 4,157,898 A | 6/1979 | Walker et al. |
| 4,182,437 A | 1/1980 | Roberts et al. |
| 4,194,887 A | 3/1980 | Ueltz et al. |
| 4,217,264 A | 8/1980 | Mable et al. |
| 4,218,253 A | 8/1980 | Dworak et al. |
| 4,238,213 A | 12/1980 | Pallo et al. |
| 4,261,706 A | 4/1981 | Blanding et al. |
| 4,311,489 A | 1/1982 | Kressner |
| 4,314,827 A | 2/1982 | Leitheiser et al. |
| 4,316,964 A | 2/1982 | Lange |
| 4,341,533 A | 7/1982 | Daire et al. |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A | 7/1985 | Makishima et al. |
| 4,543,107 A | 9/1985 | Rue |
| 4,552,199 A | 11/1985 | Onoyama et al. |
| 4,584,279 A | 4/1986 | Grabowski et al. |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Pepper |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A | 9/1988 | Monroe et al. |
| 4,772,511 A | 9/1988 | Wood et al. |
| 4,780,268 A | 10/1988 | Papsi et al. |
| 4,789,501 A | 12/1988 | Day et al. |
| 4,799,939 A | 1/1989 | Bloecher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Wood et al. |
| 4,898,587 A | 2/1990 | Mera |
| 4,898,597 A | 2/1990 | Hay et al. |
| 4,950,294 A | 8/1990 | Hakamatsuka |
| 4,960,441 A | 10/1990 | Pellow et al. |
| 4,997,461 A | 3/1991 | Markhoff-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A | 4/1991 | Wald et al. |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,057,018 A | 10/1991 | Bowen |
| 5,071,801 A | 12/1991 | Bedard et al. |
| 5,085,671 A | 2/1992 | Martin et al. |
| 5,090,968 A | 2/1992 | Pellow |
| 5,094,672 E | 3/1992 | Giles, Jr. et al. |
| 5,104,319 A | 4/1992 | Evans et al. |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,215,563 A | 6/1993 | LaCourse et al. |
| 5,227,104 A | 7/1993 | Bauer |
| 5,248,318 A | 9/1993 | Tamamaki et al. |
| 5,259,147 A | 11/1993 | Falz et al. |
| 5,273,566 A | 12/1993 | Balcar et al. |
| 5,282,875 A | 2/1994 | Wood et al. |
| 5,312,789 A | 5/1994 | Wood |
| 5,336,280 A | 8/1994 | Dubots et al. |

| | | |
|---|---|---|
| 5,352,254 A | 10/1994 | Celikkaya |
| 5,366,523 A | 11/1994 | Rowenhorst et al. |
| 5,372,620 A | 12/1994 | Rowse et al. |
| 5,376,470 A | 12/1994 | Sprouse |
| 5,378,251 A | 1/1995 | Culler et al. |
| 5,378,662 A | 1/1995 | Tsuyuki |
| 5,395,407 A | 3/1995 | Cottringer et al. |
| 5,413,974 A | 5/1995 | Yokoyama et al. |
| 5,417,726 A | 5/1995 | Stout et al. |
| 5,427,595 A | 6/1995 | Pihl et al. |
| 5,429,647 A | 7/1995 | Larmie |
| 5,431,704 A | 7/1995 | Tamamaki et al. |
| 5,436,063 A | 7/1995 | Follett et al. |
| 5,443,906 A | 8/1995 | Pihl et al. |
| 5,449,389 A | 9/1995 | Yoshizumi et al. |
| 5,484,752 A | 1/1996 | Waku et al. |
| 5,496,386 A | 3/1996 | Broberg et al. |
| 5,498,269 A | 3/1996 | Larmie |
| 5,516,348 A | 5/1996 | Conwell et al. |
| 5,520,711 A | 5/1996 | Helmin |
| 5,534,843 A | 7/1996 | Tsunoda et al. |
| 5,547,479 A | 8/1996 | Conwell et al. |
| 5,549,962 A | 8/1996 | Holmes et al. |
| 5,551,963 A | 9/1996 | Larmie |
| 5,552,213 A | 9/1996 | Eschner |
| 5,569,547 A | 10/1996 | Waku et al. |
| 5,593,467 A | 1/1997 | Monroe |
| 5,605,870 A | 2/1997 | Strom-Olsen et al. |
| 5,609,706 A | 3/1997 | Benedict et al. |
| 5,611,829 A | 3/1997 | Monroe et al. |
| 5,641,469 A | 6/1997 | Garg et al. |
| 5,645,619 A | 7/1997 | Erickson et al. |
| 5,651,925 A | 7/1997 | Ashley et al. |
| 5,395,407 A | 8/1997 | Cottringer et al. |
| 5,653,775 A | 8/1997 | Plovnick et al. |
| 5,665,127 A | 9/1997 | Moltgen et al. |
| 5,679,067 A | 10/1997 | Johnson et al. |
| 5,682,082 A | 10/1997 | Wei et al. |
| 5,693,239 A * | 12/1997 | Wang et al. .................. 216/88 |
| 5,721,188 A * | 2/1998 | Sung et al. ................. 427/454 |
| 5,725,162 A | 3/1998 | Garg et al. |
| 5,733,178 A | 3/1998 | Ohishi |
| 5,733,564 A | 3/1998 | Lehtinen |
| 5,738,696 A | 4/1998 | Wu |
| 5,747,397 A | 5/1998 | McPherson et al. |
| 5,763,345 A | 6/1998 | Ohshima et al. |
| 5,782,940 A | 7/1998 | Jayan et al. |
| 5,804,513 A * | 9/1998 | Sakatani et al. ............. 51/309 |
| 5,847,865 A | 12/1998 | Gopinath et al. |
| 5,856,254 A | 1/1999 | Feige et al. |
| 5,863,308 A | 1/1999 | Qi et al. |
| 5,876,470 A | 3/1999 | Abrahamson |
| 5,902,763 A | 5/1999 | Waku et al. |
| 5,903,951 A | 5/1999 | Ionta et al. |
| 5,952,256 A | 9/1999 | Morishita et al. |
| 5,954,844 A | 9/1999 | Law et al. |
| 5,961,674 A | 10/1999 | Gagliardi et al. |
| 5,975,988 A | 11/1999 | Christianson |
| 5,976,274 A | 11/1999 | Inoue et al. |
| 5,981,413 A | 11/1999 | Hale |
| 5,981,415 A | 11/1999 | Waku et al. |
| 6,053,956 A | 4/2000 | Wood |
| 6,054,093 A | 4/2000 | Torre, Jr. et al. |
| 6,123,743 A | 9/2000 | Carman et al. |
| 6,128,430 A | 10/2000 | Chu et al. |
| 6,146,244 A * | 11/2000 | Atsugi et al. ................. 451/36 |
| 6,214,429 B1 | 4/2001 | Zou et al. |
| 6,245,700 B1 | 6/2001 | Budd et al. |
| 6,251,813 B1 | 6/2001 | Sato |
| 6,254,981 B1 | 7/2001 | Castle |
| 6,268,303 B1 | 7/2001 | Aitken et al. |
| 6,277,161 B1 | 8/2001 | Castro et al. |
| 6,287,353 B1 | 9/2001 | Celikkaya |
| 6,306,926 B1 | 10/2001 | Bretscher et al. |
| 6,335,083 B1 | 1/2002 | Kasai et al. |
| 6,361,414 B1 | 3/2002 | Ravkin et al. |
| 6,362,119 B1 | 3/2002 | Chiba |
| 6,447,937 B1 | 9/2002 | Murakawa et al. |
| 6,451,077 B1 | 9/2002 | Rosenflanz |
| 6,454,822 B1 | 9/2002 | Rosenflanz |
| 6,458,731 B1 | 10/2002 | Rosenflanz |
| 6,461,988 B2 | 10/2002 | Budd et al. |
| 6,469,825 B1 | 10/2002 | Digonnet et al. |
| 6,482,758 B1 | 11/2002 | Weber et al. |
| 6,482,761 B1 | 11/2002 | Watanabe et al. |
| 6,484,539 B1 | 11/2002 | Nordine et al. |
| 6,490,081 B1 | 12/2002 | Feillens et al. |
| 6,511,739 B2 | 1/2003 | Kasai et al. |
| 6,514,892 B1 | 2/2003 | Kasai et al. |
| 6,521,004 B1 | 2/2003 | Culler et al. |
| 6,582,488 B1 | 6/2003 | Rosenflanz |
| 6,583,080 B1 | 6/2003 | Rosenflanz |
| 6,589,305 B1 | 7/2003 | Rosenflanz |
| 6,592,640 B1 | 7/2003 | Rosenflanz |
| 6,596,041 B2 | 7/2003 | Rosenflanz |
| 6,607,570 B1 | 8/2003 | Rosenflanz et al. |
| 6,620,214 B2 | 9/2003 | McArdle et al. |
| 6,666,750 B1 | 12/2003 | Rosenflanz |
| 6,749,653 B2 | 6/2004 | Castro et al. |
| 2001/0030811 A1 | 10/2001 | Kasal et al. |
| 2002/0066233 A1 | 6/2002 | McArdle et al. |
| 2002/0160694 A1 | 10/2002 | Wood et al. |
| 2003/0040423 A1 | 2/2003 | Harada et al. |
| 2004/0148868 A1 | 8/2004 | Anderson et al. |
| 2005/0075233 A1 | 4/2005 | Weber et al. |

FOREIGN PATENT DOCUMENTS

| | | |
|---|---|---|
| EP | 0 227 374 | 7/1987 |
| EP | 0 236 507 | 9/1987 |
| EP | 0 291 029 A1 | 11/1988 |
| EP | 0 408 771 A1 | 1/1991 |
| EP | 0 469 271 | 2/1992 |
| EP | 0 480 678 A1 | 4/1992 |
| EP | 0 494 638 | 7/1992 |
| EP | 0 495 536 A2 | 7/1992 |
| EP | 0 579 281 A1 | 1/1994 |
| EP | 0 601 453 A2 | 6/1994 |
| EP | 0 647 601 A1 | 4/1995 |
| EP | 0 666 238 B1 | 8/1995 |
| EP | 0 666 239 B1 | 8/1995 |
| EP | 0 709 347 | 5/1996 |
| EP | 0 722 919 A1 | 7/1996 |
| EP | 0 291 029 B2 | 11/1996 |
| FR | 1547989 | 10/1968 |
| FR | 2 118 026 | 7/1972 |
| FR | 2 538 370 | 6/1984 |
| FR | 2 609 708 | 7/1988 |
| GB | 793503 | 4/1958 |
| GB | 1005338 | 9/1965 |
| GB | 1 121 875 | 7/1968 |
| GB | 1 260 933 A | 1/1972 |
| GB | 2 116 992 | 10/1983 |
| JP | 50-25608 | 3/1975 |
| JP | 59 22 7726 A | 12/1984 |
| JP | 60-221338 | 11/1985 |
| JP | 61099665 | 5/1986 |
| JP | 62-003041 | 1/1987 |
| JP | 63-156024 | 6/1988 |
| JP | 63-303821 | 12/1988 |
| JP | 4-119941 | 4/1992 |
| JP | 05-085821 | 4/1993 |
| JP | 05-226733 | 9/1993 |
| JP | 06 040765 A | 2/1994 |
| JP | 06-171974 | 6/1994 |
| JP | 3113428 A | 5/1999 |

| | | |
|---|---|---|
| JP | 11-189926 | 7/1999 |
| JP | 10-208229 | 2/2000 |
| JP | 10-208244 | 2/2000 |
| JP | 200045128 A | 2/2000 |
| JP | 200045129 A | 2/2000 |
| JP | 201294480 | 10/2001 |
| JP | 2003-94414 | 4/2003 |
| KR | 9601009 B1 | 1/1996 |
| SU | 1455569 | 10/1996 |
| WO | WO 94/14722 | 7/1994 |
| WO | WO 97/16385 | 5/1997 |
| WO | WO 97/25284 | 7/1997 |
| WO | WO 00/34201 | 6/2000 |
| WO | WO 01/16047 A2 | 3/2001 |
| WO | WO 01/23321 A1 | 4/2001 |
| WO | WO 01/23323 A1 | 4/2001 |
| WO | WO 01/27046 A1 | 4/2001 |
| WO | WO 01/56946 A | 8/2001 |
| WO | WO 01/56947 A | 8/2001 |
| WO | WO 01/56949 A | 8/2001 |
| WO | WO 01/56950 A | 8/2001 |
| WO | WO 02/08146 A | 1/2002 |
| WO | WO 03/011776 A1 | 2/2003 |

OTHER PUBLICATIONS

Gonazalez, Eduardo J., et al., "High Pressure Compaction and Sintering of Nano-Size $\gamma$-$Al_2O_3$ Powder", *Materials and Manufacturing Processes* vol. 11, No. 6, 951-967, 1996.

Jantzen, C.M., Krepski, R.P., & Herman, H., "Ultra-Rapid Quenching of Laser-Method Binary and Unary Oxides", *Mat. Res. Bull.* 15, 1313-1326 (1980).

Khor K.A., "Novel ZrO2-Mullite Composites Produced By Plasma Spraying", Proceedings of the 15th International Thermal Pray Conference, May 25-29, 1998, Nice, France.

Ray, C.S. and Day, D.E., "Determining the Nucleation Rate Curve for Lithium Disilicate Glass by Differential Thermal Analysis", J. Am. Ceram. Soc. 73(2) 439-442 (1990).

Schmucker, M, et al., "Constitution of Mullite Glasses Produced by Ultra-Rapid Quenching of Plasma-Sprayed Melts", Journal of the European Ceramic Society 15 (1995) 1201-1205.

Sarjeant, P.T, & Roy, R., in *Reactivity of Solids* (ed. J. W. Mitchell, R.C., DeVries, R.W., Roberts and P. Cannon) 725-33 (John Wiley & Sons, Inc., New York 1969).

Takamori, T., & Roy, R., "Rapid Crystallization of SiO2-Al2O3 Glasses", Journal of American Society, vol. 56, No. 12, Dec. 1973.

Weber et al., "Synthesis and Optical Properties of Rare-Earth-Aluminum Oxide Glasses", J. Am. Ceram. Soc. 85(5) 1309-1311 (2002).

Wilding, M.C., McMillan, P.F., "Polymorphic Transitions in Yttria-Alumina Liquids", *J. Non-Cryst. Solids.* 293-295, 357-365 (2001).

U.S. Application entitled "Methods of Making $Al_2O_3$-$SiO_2$ Ceramics," Celikkaya et al., filed Sep. 5, 2003, having U.S. Appl. No. 10/655,729.

U.S. Application entitled "Methods of Making Ceramics Comprising $AL_2O_3$, REO, $ZRO_2$ and/or $HfO_2$ and $Nb_2O_5$ and/or $Ta_2O_5$," Rosenflanz, filed Sep. 18, 2003, having U.S. Appl. No. 10/666,615.

U.S. Application entitled "Ceramics Comprising $AL_2O_3$, REO, $ZRO_2$ and/or $HfO_2$ and $Nb_2O_5$ and/or $Ta_2O_5$ and Methods of Making the Same," Rosenflanz et al., filed Sep. 18, 2003, having U.S. Appl. No. 10/666,212.

U.S. Application entitled "Ceramics Comprising $AL_2O_3$, $ZRO_2$ and/or $HfO_2$ and $Nb_2O_5$ and/or $Ta_2O_5$ and Methods of Making the Same," Rosenflanz et al., filed Sep. 18, 2003, having U.S. Appl. No. 10/666,098.

U.S. Application entitled "Alumina-Yttria Particles and Methods of Making the Same," Anderson et al., filed Dec. 18, 2003, having U.S. Appl. No. 10/740,262.

U.S. Application entitled "Method of Making Abrasive Particles," Anderson et al., filed Dec. 18, 2003, having U.S. Appl. No. 10/739,420.

U.S. Application entitled "Transparent Fused Crystalline Ceramic, and Method of Making the Same," Rosenflanz et al., filed Dec. 18, 2003, having U.S. Appl. No. 10/739,439.

U.S. Application entitled "Method of Making Abrasive Particles," Anderson et al., filed Dec. 18, 2003, having U.S. Appl. No. 10/739,440.

U.S. Application entitled "Method of Making Abrasive Particles," Celikkaya et al., filed Dec. 18, 2003, having U.S. Appl. No. 10/740,096.

U.S. Application entitled "Method of Making Abrasive Particles," Celikkaya et al., filed Dec. 18, 2003, having U.S. Appl. No. 10/739,441.

U.S. Application entitled "Powder Feeding Method and Apparatus," Celikkaya et al., filed Dec. 18, 2003, having U.S. Appl. No. 10/739,233.

U.S. Application entitled "Use of Ceramics in Dental and Orthodontic Applications," Cummings et al., filed Feb. 5, 2003, having U.S. Appl. No. 10/358,856.

U.S. Application entitled "Use of Glasses Containing Rare Earth Oxide, Alumina, and Zirconia and Dopant in Optical Waveguides," Cummings et al., filed Apr. 28, 2003, having U.S. Appl. No. 10/425,039.

U.S. Application entitled "Ceramic Aggregate Particles," McArdle et al., filed Feb. 11, 2004, having U.S. Appl. No. 10/776,156.

Article: Imakoa, Minoru et al., "Refractive Index and Abbe's Number of Glass of Lanthanum Borate System," *Journal Ceramic Assoc. Japan*, vol. 70, No. 5, (1962), pp. 115 et seq.

Book Excerpt: Kingery, W.D., *Introduction to Ceramics*, Second Edition, Chpt. III subchapter 8.8, Glass-Ceramic Materials, (1976), pp. 368-374.

Article: Kokubo, Tadashi et al., "Infrared Transmission of ($R_2O$ or R'O)-($TiO_2$, $Nb_2O_5$ or $Ta_2O_5$)-$Al_2O_3$ Glasses," *Journal of Non-Crystalline Solids 22*, (1970), pp. 125-134.

Book: McMillan, P.W., *Glass-Ceramics*, Academic Press, Inc., 2nd Edition (1979). (Too Voluminous).

Symposium: Stookey, "Ceramics Made by Nucleation of Glass—Comparison of Microstructure and Properties with Sintered Ceramics," (1962), pp. 1-4.

Affidavit Under §1.132 for Anatoly Rosenflanz.

Book Excerpt: Varshneya, *Fundamentals of Inorganic Glasses*, (1994), pp. 425-427.

Symposium: Weber et al., "Rare Earth Oxide—Aluminum Oxide Glasses for Mid-Range IR Devices," Containerless Research, Inc., BIOS 2003, Optical Fibers and Sensors for Medical Applications III, Conference 4957, (2003), 7 pages.

Symposium: Weber et al., "Device Materials Based on Er-, Ho-, Tm-, and Yb-Doped Rare Earth Aluminum Oxide (REAL™) Glass," Containerless Research, Inc., BIOS 2003, Optical Fibers and Sensors for Medical Applications III, Conference 4957, (2003), 7 pages.

Kondrashov V I et al., "Opacified Glass "Decorit" Synthesis Directions", Steklo I Kermika 2001, No. 1, pp. 8-11.

"$Gd_3Al_5O_{12}$ Phase Obtained by Crystallization of Amorphous $Gd_2O_3$·5/3 $Al_2O_3$," Shishido et al., *Journal of the American Ceramic Society*, vol. 61, No. 7-8, Jul.-Aug. 1978, pp. 373-374.

"Rapid Quenching on the Binary Systems of High Temperature Oxides," Suzuki et al., *Mat. Res. Bull.*, vol. 9, 1974, pp. 745-754.

"Unusual Glass Formation in the A1-Nd-O System," Yajima et al., Chemistry Letters (published by the Chemical Society of Japan), 1973, pp. 741-742.

Glass Formation in the Ln-Al-O System, (Ln: Lanthanoid and Yttrium Elements), Yajima et al., Chemistry Letters, 1973, pp. 1327-1330.

"Production and Studies of Alumina Based Refractory Glass," Coutures et al., *Mat. Res. Bull.*, vol. 10, No. 6, 1975, pp. 539-546.

"Net Optical Gain at 1.53 µm in Er-Doped $Al_2O_3$ Waveguides on Silicon," van den Hoven et al., Appl. Phys. Lett. 68 (14), Apr. 1, 1966, pp. 1886-1888.

"Durable 3—5 µm Transmitting Infrared Window Materials," Harris et al., Infrared Physics & Technology 39, 1998, pp. 185-201.

"Erbium-Doped Phosphate Glass Waveguide on Silicon With 4.1 dB/cm Gain at 1.535 µm," Yan et al., Appl. Phys. Lett, 71 (20), Nov. 17, 1997.

U.S. Appl. No. 10/358,772, filed Feb. 5, 2003, Methods of Making Ceramic Particles.
U.S. Appl. No. 10/358,765, filed Feb. 5, 2003, Methods of Making Ceramics.
U.S. Appl. No. 10/358,910, filed Feb. 5, 2003, Ceramics and Methods of Making the Same.
U.S. Appl. No. 10/358,855, filed Feb. 5, 2003, $Al_2O_3$-$La_2O_3$-$Y_2O_3$-MgO Ceramics, and Methods of Making the Same.
U.S. Appl. No. 10/358,708, filed Feb. 5, 2003, Methods of Making $Al_2O_3$-$SiO_2$ Ceramics.
Abstract for "Kinetics of Nonisothermal Sintering of Some Eutectic Oxide Compositions," I. Yu Volkova et al., 1986 (abstract from Database Chemabs 'Online! Chemical Abstracts Service, Columbus, Ohio, US).
"Eutectic Precipitation of the Spinel Solid Solution -Yttrium Aluminum Garnet (YAG) System," Shuqiang Wang et al., *Journal of the American Ceramic Society*, 1998, vol. 81, No. 1, pp. 263-265.
"Microstructures of laser-treated $Al_2O_3$-$ZrO_2$-$CeO_2$ composites," Zan-Hwey Chen et al., *Materials Science & Engineering A (Structural Materials: Properties, Microstructure and Processing)*, 1995, vol. A196, No. 1-2, pp. 253-260.
"Advances in the Grinding Efficiency of Sintered Alumina Abrasives," Andreas Krell et al., *Journal of the American Ceramic Society*, 1996, vol. 79, No. 3, pp. 763-769.
"Interface modification for increased fracture toughness in reaction-formed yttrium aluminum garnet/alumina eutectic composites,". Luke N. Brewer et al., 1999, vol. 14, No. 10, pp. 3907-3912.
Dow Jones Interactive Internet Printout on Jun. 20, 2001 for web address "http://ptg.djnr.com/ccroot/asp/publib/story.asp"; "China's Rare Earth Industry In the Doldrums", Asia Pulse, Jan. 28, 1999, 2 pages.
Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.
Dow Jones Interactive Internet Printout on Jun. 20, 2001 for web address "http://ptg.djnr.com/ccroot/asp/publib/story.asp"; "ELEMENTS: China to Impose Quotas on Rare Earth Exports", Chemical Business NewsBase, Feb. 4, 1999, 1 page.
Dow Jones Interactive Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.
Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.
Dow Jones Interactive Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.
Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.
"China: Oversupply Puts Rare Earths Projects On Hold", Industrial Minerals, Aug. 1997, 1 page.
"Increase in Value of Rare Earth Products Boosts Yixing Xinwei", W. Yau, South China Morning Post, Apr. 12, 2000, 2 pages.
"Rare Earth—Market Confusion Inevitable Due to China's Unstable Supply", Japan Chemical Week, vol. 41, No. 2080, Jul. 6, 2000, pp. 6-7.
"Rare Earths Prices Recover Despite China's Overcapacity", Louise Rodriquez, American Metal Market, vol. 109, No. 14, Jan. 22, 2001, p. 13.
"Prices: Minerals", Asian Ceramics & Glass, Jan. 2001, 2 pages.
"China Rare Earth Information", China Rare Earth Information Center, vol. 6, No. 4, Aug. 2000, 3 pages.
"Microstructure and Thermal Stability of $Al_2O_3$/$Y_3Al_5O_{12}$ (YAG) Eutectic Composite Prepared by an Arc Discharge Method", T. Isobe et al., J. Ceram. Soc. Jap., 109, [1], 2001, pp. 66-70, Abstract in English.

"Divorced Eutectic and Interface Characteristics in a Solidified YAG-Spinel Composite With Spinel-Rich Composition", S. Wang et al., J. Mat. Sci., 35, 2000, pp. 2757-2761.
"Processing, Microstructure, and Strength of Alumina-YAG Eutectic Polycrystals", Tai-ll Mah et al., J. Am. Ceram. Soc., 83, [8], 2000, pp. 2088-2090.
"Phase Identification of $Al_2O_3$/$RE_3Al_5O_{12}$ and $Al_2O_3$/$REAlO_3$ (RE=Sm-Lu, Y) Eutectics", J. Crystal Growth, 218, 2000, pp. 67-73.
"Crystallization and Thermal Properties of $Al_2O_3$-$Y_2O_3$ Melts", S. V. Stankus et al., J. Crystal Growth, 167, 1996, pp. 165-170.
Dialog © file 319: Chem Bus NewsBase © 2001 Royal Soc Chemistry. Abstract for "China: Oversupply Puts Rare Earths Projects On Hold", Industrial Minerals n 359, p. 10.
"Rare-Earth Metals", J. Hedrick, pp. 61.1-61.6, 1997.
"Rare-Earth Metal Prices in the USA ca. 1960 to 1994", J. Hedrick, J. Alloys and Compounds, 1997, pp. 471-481.
"Preliminary data on subsolidus phase equilibria in the $La_2O_3$-$Al_2O_3Mn_2O_3$ and $La_2O_3$-$Al_2O_3$-$Fe_2O_3$ systems", Hrovat et al., *Journal of Materials Science Letters*, vol. 14, 1995, pp. 265-267.
"Aspects of Synthesis of Decorite Opacified Glass", Keramika, *Glass and Ceramics*, vol. 58, Nos. 1-2, pp. 8-11, Jan. 2001.
"A New Ceramic Eutectic Composite with High Strength at 1873 K", Yoshiharu Waku, *Advanced Materials*, vol. 10, No. 8, 1998, pp. 615-617.
"Synthesis of Y-Al Garnet", Krokhin et al., *Glass and Ceramics*, vol. 55, Nos. 5-6, 1998, pp. 151-152.
"High-temperature strength and thermal stability of a unidirectionally solidified $Al_2O_3$/YAG eutectic composite", Waku et al., pp. 1217-1225.
"Sapphire matrix composites reinforced with single crystal VAG phases", Waku et al., *Journal of Materials Science*, vol. 31, 1996, pp. 4663-4670.
"Thermo-Mechanical Stability Of Directionally Solidified $Al_2O_3$-$ZrO_2(Y_2O_3)$ Eutectic Fibers", Yang and Zhu, *Scripta Materialia*, vol. 36, No. 8, 1997, pp. 961-965.
"A ductile ceramic eutectic composite with high strength at 1,873 K", Waku et al., *Nature*, vol. 389, Sep. 1997, pp. 49-52.
"The Liquidus Surface In The $Al_2O_3$-$ZrO_2$-$Y_2O_3$ Phase Diagram", Lakiza et al., *Powder Metallurgy and Metal Ceramics*, vol. 33, No. 11-12, 1994, pp. 595-597.
"Powder-Material Research Methods And Properties Polythermal Sections Of The $Al_2O_3$-$ZrO_2$-$Y_2O_3$ Phase Diagram", Lakiza et al., *Powder Metallurgy and Metal Ceramics*, vol. 34, No. 11-12, 1995, pp. 655-659.
"Metastable Phase Relationships In The System $Al_2O_3$-$ZrO_2$-$Y_2O_3$", Lakiz and Lopato, *Powder Metallurgy and Metal Ceramics*, vol. 35, Nos. 11-12, 1996, pp. 621-626.
"Solidus Surface And Phase Equilibria During The Solidification Of Alloys In The $Al_2O_3$-$ZrO_2$-$Y_2O_3$ System", Lakiza et al., *Powder Metallurgy and Metal Ceramics*, vol. 34, Nos. 1-2, 1995, pp. 64-67.
"Methods Of Investigation Of Properties Of Powder Materials, Interactions In The $Al_2O_3$-$ZrO_2$-$Y_2O_3$ System", Lakiza et al., *Powder Metallurgy and Metal Ceramics*, vol. 33, Nos. 9-10, 1994, pp. 486-490.
"Rapid Solidification of Ceramics a Technology Assessment", Brockway et al. Metals and Ceramics Information Center, MCIC Report, Jan. 1984 MCIC 84-49.
Figs. 311, 346, 350, 354-56, 373, and 716, *Phase Diagrams For Ceramists*, The American Ceramic Society, 1964, pp. 122, 136, 138, 140, 144, 248.
Figs. 2340-44, 2363, 2370, 2374-75, 2382-83, 2385, 2387, 2390, and 2392, *Phase Diagrams For Ceramists*, 1969 Supplement, The American Ceramic Society, 1969, pp. 95-96, 100, 102-103, 105-108.
Figs. 4366-71, 4377-78, 4404-05, 4417, 4426, 4430, 4433, 4437, 4440, 4444, 4457, 4572, and 4602, *Phase Diagrams For Ceramists*, 1975 Supplement, The American Ceramic Society, 1975, pp. 130-132, 135-136, 147, 152, 157, 159-160, 163-164, 166, 172-173, 238, 257.
Figs. 5042, 5211, 5217, 5224, 5228, 5232, 5237, 5239, 5241, 5245, 5251, 5257, 5418, and 5437, *Phase Diagrams For Ceramists*, vol.

IV, The American Ceramic Society, 1981, pp. 29, 125, 127, 129-131, 133, 135-137, 139, 141, 143, 220, 228.

Fig. 6464, *Phase Diagrams For Ceramists*, vol. VI, The American Ceramic Society, 1981, p. 162.

Figs. 9262, and 9264, *Phase Diagrams For Ceramists*, vol. XI, Oxides, The American Ceramic Society, 1995, pp. 105-106.

"Phase Equilibria in the Yttrium Oxide-Alumina System", Toropov et al., *Bulletin of the Academy of Sciences*, USSR, Division of Chemical Science, No. 7, Jul. 1964, pp. 1076-1081, A translation of Seriya Khimicheskaya.

McKittrick, Joanna, et al., "Non-stoichiometry and defect structures in rapidly solidified MgO-$Al_2O_3$-$ZrO_2$ ternary eutectics," *Materials Science and Engineering* A231 (1997) 90-97.

Weber, J.K. Richard et al., "Glass fibres of pure and erbium- or neodymium-doped yttria-alumina compositions", Nature, Jun. 25, 1998, vol. 393, pp. 769-771.

Waku, Yoshiharu, et al., "A jelly-like ceramic fiber at 1193 K", Mat Res Innovat, 2000, vol. 3, pp. 185-189.

Weber, J.K. Richard et al., "Glass Formation and Polyamorphism in Rare-Earth Oxide-Aluminum Oxide Compositions", J. American Ceramic Society, 83[8], 2000, 1868-1872.

Aguilar, E.A., "Processing and crystallization of rapidly solidified $Al_2O_3$-$Y_2O_3$ fibres", British Ceramic Transactions, 2000, vol. 99, No. 6, pp. 256-259.

U.S. Patent Application entitled "Fused $Al_2O_3$-$Y_2O_3$ Eutectic Abrasive Particles, Abrasive Articles, And Methods Of Making And Using The Same", filed Jul. 19, 2000, Rosenflanz et al. having U.S. Appl. No. 09/620,262.

U.S. Patent Application entitled "Fused-$Al_2O_3$-MgO-$Y_2O_3$ Eutectic Abrasive Particles, Abrasive Articles, And Methods Of Making And Using The Same", filed Nov. 2, 2000, Rosenflanz having U.S. Appl. No. 09/704,843.

U.S. Patent Application entitled "Fused $Al_2O_3$ Rare Earth Oxide Eutectic Abrasive Particles, Abrasive Articles, And Methods Of Making And Using The Same", filed Jul. 19, 2000, Rosenflanz et al. having U.S. Appl. No. 09/618,879.

U.S. Patent Application entitled "Fused Abrasive Particles, Abrasive Articles, And Methods Of Making And Using The Same", filed Jul. 19, 2000, Rosenflanz et al. having U.S. Appl. No. 09/619,191.

U.S. Patent Application entitled "Fused Aluminum Oxycarbide/Nitride- $Al_2O_3$ Rare Earth Oxide Eutectic Abrasive Particles, Abrasive Articles, And Methods Of Making And Using The Same", filed Jul. 19, 2000, Rosenflanz having U.S. Appl. No. 09/619,289.

U.S. Patent Application entitled "Fused Aluminum Oxycarbide/Nitride-$Al_2O_3$ Rare Earth Oxide Eutectic Materials", filed Jul. 19, 2000, Rosenflanz having U.S. Appl. No. 09/619,106.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled "Fused $Al_2O_3$-Rare Earth Oxide-$ZrO_2$ Eutectic Materials", filed Jul. 19, 2000, Rosenflanz having U.S. Appl. No. 09/619,192.

U.S. Patent Application entitled "Fused $Al_2O_3$-Rare Earth Oxide-$ZrO_2$ Eutectic Abrasive Particles, Abrasive Articles, And Methods Of Making And Using The Same", filed Jul. 19, 2000, Rosenflanz having U.S. Appl. No. 09/619,744.

U.S. Patent Application entitled "Fused $Al_2O_3$ Rare Earth Oxide $ZrO_2$ Eutetic Materials", filed Jan. 30, 2001, Rosenflanz having U.S. Appl. No. 09/772,730.

U.S. Patent Application entitled "$Al_2O_3$-Rare Earth Oxide-$ZrO_2$/$HfO_2$ Materials, and Methods of Making and Using the Same", filed Aug. 2, 2002, Rosenflanz having U.S. Appl. No. 10/211,597.

U.S. Patent Application entitled "$Al_2O_3$$Y_2O_3$-$ZrO_2$/$HfO_2$ Materials, and Methods of Making and Using the Same", filed Aug. 2, 2002, Rosenflanz having U.S. Appl. No. 10/211,638.

U.S. Patent Application entitled "Abrasive Particles, and Methods of Making and Using the Same", filed Aug. 2, 2002, Rosenflanz having U.S. Appl. No. 10/211,629.

U.S. Patent Application entitled "Abrasive Particles, Abrasive Articles, and Methods of Making and Using the Same", filed Aug. 2, 2002, Rosenflanz et al. having U.S. Appl. No. 10/211,598.

U.S. Patent Application entitled "Abrasive Particles, and Methods of Making and Using the Same", filed Aug. 2, 2002, Rosenflanz et al. having U.S. Appl. No. 10/211,630.

U.S. Patent Application entitled "Ceramic Materials, Abrasive Particles, Abrasive Articles, and Methods of Making and Using the Same", filed Aug. 2, 2002, Rosenflanz having U.S. Appl. No. 10/211,034.

U.S. Patent Application entitled "Glass-Ceramics", filed Aug. 2, 2002, Rosenflanz having U.S. Appl. No. 10/211,044.

U.S. Patent Application entitled "Alunmina-Zirconia, and Methods of Making and Using the Same", filed Aug. 2, 2002, Rosenflanz et al. having U.S. Appl. No. 10/211,620.

U.S. Patent Application entitled "Method of Making Ceramic Articles", filed Aug. 2, 2002, Rosenflanz having U.S. Appl. No. 10/211,481.

U.S. Patent Application entitled "Plasma Spraying", filed Aug. 2, 2002, Rosenflanz et al. having U.S. Appl. No. 10/211,640.

U.S. Patent Application entitled "Method of Making Amorphous and Ceramics via Melt Spinning," filed Aug. 2, 2002, Rosenflanz et al. having U.S. Appl. No. 10/211,684.

* cited by examiner

METHOD OF MAKING AMORPHOUS MATERIALS AND CERAMICS

This application is a continuation-in-part of U.S. Ser. No. 09/922,526, now abandoned U.S. Ser. No. 09/922,527 now abandoned, U.S. Ser. No. 09/922,528 now abandoned, and U.S. Ser. No. 09/922,530 now abandoned, filed Aug. 2, 2001, the disclosures of which are incorporated herein by reference.

FIELD OF THE INVENTION

The present invention relates to methods of making amorphous and ceramic materials.

DESCRIPTION OF RELATED ART

A variety of amorphous materials (including glasses) and ceramic materials and methods for making the same are known. End products (i.e., the desired final form) of some of these processes include bulk forms such as the abrasive particles, cutting tools, substrates and other structural forms, films such as coatings, particles such as retro-reflective beads and fillers, or in a complex shape such as the engine parts. In some cases the raw materials for making a particular amorphous or ceramic article may be particles having the same composition as the resulting amorphous or ceramic article, while in other cases, collectively the raw materials provide the desired composition, but the individual raw materials may only contribute some of the components necessary for the final composition.

The desired degree of uniformity in terms of composition and if present, microstructure, may depend on the end product and its use. It is generally desirable to have uniform compositions, and microstructures. In addition, it may be desirable to have a particular composition and/or crystalline and/or non-crystalline phases present. In another aspect, it may be desirable to have the material in a specific configuration (e.g., spherical particles).

Although there are a variety of methods known for making amorphous and ceramic articles and amorphous and ceramic materials that can serve as raw materials for making such articles, there is a continuing desire for new methods for making such materials, and materials having the desired characteristics or compositions.

SUMMARY OF THE INVENTION

In one aspect, the present invention provides a method for making amorphous material (e.g., glass) comprising $Al_2O_3$, the method comprising:

melting
  (a) particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof; and
  (b) at least one of:
    (i) a M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, respectively) and a source of metal oxide other than the M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, unless it is the M oxide); or
    (ii) a complex metal oxide comprising M oxide (e.g., complex nickel oxide•metal oxide, complex calcium oxide•metal oxide, complex copper oxide•metal oxide, complex chromium oxide•metal oxide, complex iron oxide•metal oxide, complex lithium oxide•metal oxide, complex magnesium oxide•metal oxide, complex silver oxide•metal oxide, complex titanium oxide•metal oxide, complex zirconium oxide•metal oxide, and combinations thereof)

to provide a melt, wherein at least a portion of the metal, M, in the melt is oxidized (in some embodiments, preferably, substantially all of the metal, M, oxidizes (i.e., at least 95, or even at least 99 percent by weight), and wherein at least one of the M oxide, the metal oxide other than the M oxide, or the complex metal oxide comprises $Al_2O_3$; and cooling the melt to provide the amorphous material.

In some embodiments, the metal, M, from the particulate, metallic material provides at least 10, 15, 20, 25, 30, 35, 40, 45, or even at least 50 percent by weight of the M oxide of the amorphous material. In some embodiments, the amorphous material may be present in another material (e.g., particles comprising the amorphous material, ceramic comprising the amorphous material, etc.). In some embodiments the melt and amorphous material comprise, or further comprise, at least one of $Y_2O_3$, REO, $ZrO_2$, or $HfO_2$.

In this application:

"amorphous material" refers to material derived from a melt or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes amorphous material, glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramics comprising crystals formed by heat-treating amorphous material;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium (e.g., $Gd_2O_3$), holmium oxide (e.g., $Ho_2O_3$), lanthanum oxide (e.g., La$_2$O$_3$), lutetium oxide (e.g., Lu$_2$O$_3$), neodymium oxide (e.g., Nd$_2$O$_3$), praseodymium oxide (e.g., Pr$_6$O$_{11}$), samarium oxide (e.g., Sm$_2$O$_3$), terbium (e.g., Yb$_2$O$_3$), thorium oxide (e.g., Th$_4$O$_7$), thulium (e.g., Tm$_2$O$_3$), and ytterbium oxide (e.g., Yb$_2$O$_3$), and combinations thereof; and "REO" refers to rare earth oxide(s).

Further, it is understood herein that unless it is stated that a metal oxide (e.g., Al$_2$O$_3$, complex Al$_2$O$_3$.metal oxide, etc.) is crystalline, for example, in a glass-ceramic, it may be amorphous, crystalline, or portions amorphous and portions crystalline. For example 1f a glass-ceramic comprises Al$_2$O$_3$ and ZrO$_2$, the Al$_2$O$_3$ and ZrO$_2$ may each be in an amorphous state, crystalline state, or portions in an amorphous state and portions in a crystalline state, or even as a reaction product with another metal oxide(s) (e.g., unless it is stated that, for example, Al$_2$O$_3$ is present as crystalline Al$_2$O$_3$ or a specific crystalline phase of Al$_2$O$_3$ (e.g., alpha Al$_2$O$_3$), it may be present as crystalline Al$_2$O$_3$ and/or as part of one or more crystalline complex Al$_2$O$_3$.metal oxides.

Further, it is understood that glass-ceramics formed by heating amorphous material not exhibiting a $T_g$ may not actually comprise glass, but rather may comprise the crystals and amorphous material that does not exhibiting a $T_g$.

In another aspect, the present invention provides a method for making an article comprising glass comprising Al$_2$O$_3$, the method comprising:

melting
 (a) particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof; and
 (b) at least one of:
  (i) a M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, respectively) and a source of metal oxide other than the M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, unless it is the M oxide); or
  (ii) a complex metal oxide comprising M oxide (e.g., complex nickel oxide•metal oxide, complex calcium oxide•metal oxide, complex copper oxide•metal oxide, complex chromium oxide•metal oxide, complex iron oxide•metal oxide, complex lithium oxide•metal oxide, complex magnesium oxide•metal oxide, complex silver oxide•metal oxide, complex titanium oxide•metal oxide, complex zirconium oxide•metal oxide, and combinations thereof)
 to provide a melt, wherein at least a portion of the metal, M, in the melt is oxidized (in some embodiments, preferably, substantially all of the metal, M, oxidizes (i.e., at least 95, or even at least 99 percent by weight), and wherein at least one of the M oxide, the metal oxide other than the M oxide, or the complex metal oxide comprises Al$_2$O$_3$;
 cooling the melt to provide glass particles (e.g. beads), the glass having a $T_g$;
 heating the glass particles above the $T_g$ such that the glass particles coalesce to form a shape; and
 cooling the shape to provide the article.

In some embodiments, the metal, M, from the particulate, metallic material provides at least 10, 15, 20, 25, 30, 35, 40, 45, or even at least 50 percent by weight of the M oxide of the glass. In some embodiments the melt and glass comprise, or further comprise, at least one of Y$_2$O$_3$, REO, ZrO$_2$, or HfO$_2$.

In another aspect, the present invention provides a method for making glass-ceramic comprising Al$_2$O$_3$, the method comprising:

melting
 (a) particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof; and
 (b) at least one of:
  (i) a M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, respectively) and a source of metal oxide other than the M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, unless it is the M oxide); or
  (ii) a complex metal oxide comprising M oxide (e.g., complex nickel oxide•metal oxide, complex calcium oxide•metal oxide, complex copper oxide•metal oxide, complex chromium oxide•metal oxide, complex iron oxide•metal oxide, complex lithium oxide•metal oxide, complex magnesium oxide•metal oxide, complex silver oxide•metal oxide, complex titanium oxide•metal oxide, complex zirconium oxide•metal oxide, and combinations thereof)
 to provide a melt, wherein at least a portion of the metal, M, in the melt is oxidized (in some embodiments, preferably, substantially all of the metal, M, oxidizes (i.e., at least 95, or even at least 99 percent by weight), and wherein at least one of the M oxide, the metal oxide other than the M oxide, or the complex metal oxide comprises Al$_2$O$_3$; and
 cooling the melt to provide amorphous material;
 heat-treating the amorphous material such that at least a portion thereof is converted to a glass-ceramic.

In some embodiments, the metal, M, from the particulate, metallic material provides at least 10, 15, 20, 25, 30, 35, 40, 45, or even at least 50 percent by weight of the M oxide of the amorphous material. In some embodiments, the amorphous material may be present in another material (e.g., particles comprising the amorphous material, ceramic comprising the amorphous material, etc.). In some embodiments the melt, amorphous material, and glass-ceramic comprise, or further comprise, at least one of Y$_2$O$_3$, REO, ZrO$_2$, or HfO$_2$.

In another aspect, the present invention provides a method for making an article comprising glass comprising Al$_2$O$_3$, the method comprising:

melting
 (a) particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof; and (b) at least one of:
   (i) a M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, respectively) and a source of metal oxide other than the M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, unless it is the M oxide); or
   (ii) a complex metal oxide comprising M oxide (e.g., complex nickel oxide•metal oxide, complex calcium oxide•metal oxide, complex copper oxide•metal oxide, complex chromium oxide•metal oxide, complex iron oxide•metal oxide, complex lithium oxide•metal oxide, complex magnesium oxide•metal oxide, complex silver oxide•metal oxide, complex titanium oxide•metal oxide, complex zirconium oxide•metal oxide, and combinations thereof)

to provide a melt, wherein at least a portion of the metal, M, in the melt is oxidized (in some embodiments, preferably, substantially all of the metal, M, oxidizes (i.e., at least 95, or even at least 99 percent by weight), and wherein at least one of the M oxide, the metal oxide other than the M oxide, or the complex metal oxide comprises $Al_2O_3$;

cooling the melt to provide glass particles (e.g. beads), the glass having a $T_g$;

heating the glass particles above the $T_g$ such that the glass particles coalesce to form a shape;

cooling the shape to provide an article comprising glass; and heat-treating the article such that at least a portion of the glass is converted to a glass-ceramic.

In some embodiments, the metal, M, from the particulate, metallic material provides at least 10, 15, 20, 25, 30, 35, 40, 45, or even at least 50 percent by weight of the M oxide of the glass. In some embodiments the melt, glass, and glass-ceramic comprise, or further comprise, at least one of $Y_2O_3$, REO, $ZrO_2$, or $HfO_2$.

In another aspect, the present invention provides a method for making abrasive particles comprising $Al_2O_3$, the method comprising:
melting
   (a) particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof; and
   (b) at least one of:
      (i) a M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, respectively) and a source of metal oxide other than the M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, unless it is the M oxide); or
      (ii) a complex metal oxide comprising M oxide (e.g., complex nickel oxide•metal oxide, complex calcium oxide•metal oxide, complex copper oxide•metal oxide, complex chromium oxide•metal oxide, complex iron oxide•metal oxide, complex lithium oxide•metal oxide, complex magnesium oxide•metal oxide, complex silver oxide•metal oxide, complex titanium oxide•metal oxide, complex zirconium oxide•metal oxide, and combinations thereof)

to provide a melt, wherein at least a portion of the metal, M, in the melt is oxidized (in some embodiments, preferably, substantially all of the metal, M, oxidizes (i.e., at least 95, or even at least 99 percent by weight), and wherein at least one of the M oxide, the metal oxide other than the M oxide, or the complex metal oxide comprises $Al_2O_3$;

cooling the melt to provide amorphous material;

crushing the amorphous material to provide particles comprising the amorphous material; and heat-treating the particles such that at least a portion of the amorphous material is converted to a glass-ceramic to provide abrasive particles comprising the glass-ceramic.

In some embodiments, the method further comprises grading the abrasive particles comprising the glass-ceramic to provide a plurality of abrasive particles having a specified nominal grade, wherein at least a portion of the plurality of abrasive particles is a plurality of the abrasive particles comprising the glass-ceramic. In some embodiments, the metal, M, from the particulate, metallic material provides at least 10, 15, 20, 25, 30, 35, 40, 45, or even at least 50 percent by weight of the M oxide of the amorphous material. In some embodiments, the amorphous material may be present in another material (e.g., particles comprising the amorphous material, ceramic comprising the amorphous material, etc.). In some embodiments the melt, amorphous material, and glass-ceramic comprise, or further comprise, at least one of $Y_2O_3$, REO, $ZrO_2$, or $HfO_2$. The abrasive particles can be incorporated into an abrasive article, or used in loose form.

In another aspect, the present invention provides a method for making abrasive particles comprising $Al_2O_3$, the method comprising:
melting
   (a) particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof; and
   (b) at least one of:
      (i) a M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, respectively) and a source of metal oxide other than the M oxide (e.g., aluminum oxide, calcium oxide, copper oxide, chromium oxide, iron oxide, lithium oxide, magnesium oxide, nickel oxide, silver oxide, titanium oxide, zirconium oxide, and combinations thereof, unless it is the M oxide); or
      (ii) a complex metal oxide comprising M oxide (e.g., complex nickel oxide•metal oxide, complex calcium oxide•metal oxide, complex copper oxide•metal oxide, complex chromium oxide•metal oxide, complex iron oxide•metal oxide, complex lithium oxide•metal oxide, complex magnesium oxide•metal oxide, complex silver oxide•metal oxide, complex titanium oxide•metal oxide, complex zirconium oxide•metal oxide, and combinations thereof) to provide a melt, wherein at least a portion of the metal, M, in the melt is oxidized (in some embodiments, preferably, substantially all of the metal, M, oxidizes (i.e., at least 95, or even at least 99 percent by weight), and wherein at least one of the M oxide, the metal oxide other than the M oxide, or the complex metal oxide comprises $Al_2O_3$;

converting the melt into particles comprising the amorphous material, wherein the converting includes cooling the melt to provide the amorphous material; and heat-treating the particles comprising the amorphous material such that at least a portion of the amorphous material is converted to a glass-ceramic to provide abrasive particles comprising the glass-ceramic.

In some embodiments, the method further comprises grading the particles comprising the amorphous material such that after heat-treating a plurality of particles having a specified nominal grade is provided, wherein at least a portion of the plurality of abrasive particles is a plurality of the abrasive particles comprising the glass-ceramic. In some embodiments, the method further comprising grading the abrasive particles comprising the glass-ceramic to provide a plurality of abrasive particles having a specified nominal grade, wherein at least a portion of the plurality of abrasive particles is a plurality of the abrasive particles comprising the glass-ceramic. In some embodiments, the metal, M, from the particulate, metallic material provides at least 10, 15, 20, 25, 30, 35, 40, 45, or even at least 50 percent by weight of the M oxide of the amorphous material. In some embodiments, the amorphous material may be present in another material (e.g., particles comprising the amorphous material, ceramic comprising the amorphous material, etc.). In some embodiments the melt, amorphous material, and glass-ceramic comprise, or further comprise, at least one of $Y_2O_3$, REO, $ZrO_2$, or $HfO_2$. The abrasive particles can be incorporated into an abrasive article, or in loose form.

Amorphous materials and glass-ceramics made according to the present invention can be made, formed as, or converted into particles (e.g., glass beads (e.g., beads having diameters of at least 1 micrometers, 5 micrometers, 10 micrometers, 25 micrometers, 50 micrometers, 100 micrometers, 150 micrometers, 250 micrometers, 500 micrometers, 750 micrometers, 1 mm, 5 mm, or even at least 10 mm)), articles (e.g., plates), fibers, particles, and coatings (e.g., thin coatings). Amorphous materials and/or glass-ceramic particles and fibers are useful, for example, as thermal insulation, filler, or reinforcing material in composites (e.g., ceramic, metal, or polymeric matrix composites). The thin coatings can be useful, for example, as protective coatings in applications involving wear, as well as for thermal management. Examples of articles according of the present invention include kitchenware (e.g., plates), dental brackets, and reinforcing fibers, cutting tool inserts, abrasive materials, and structural components of gas engines, (e.g., valves and bearings). Other articles include those having a protective coating of ceramic on the outer surface of a body or other substrate.

Although not wanting to be bound by theory, it is believed that the heat resulting from the exothermic reaction associated with the oxidation of the metal is beneficial in the formation of a homogeneous melt and resulting amorphous material. For example, it is believed that the additional heat generated by the oxidation reaction within the raw material eliminates or minimizes insufficient heat transfer, and hence facilitates formation and homogeneity of the melt, particularly when forming amorphous particles with x, y, and z dimensions over 150 micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or otherwise not practical due to high melting point of the materials. Further, the presence of the additional heat generated by the oxidation reaction actually enables the formation of amorphous material that otherwise could not be made, or could not be made in the desired size range. Another advantage of the invention include, in forming the amorphous materials, that many of the chemical and physical processes such as melting, densification and spherodizing can be achieved in a short time, so that very high quench rates be can achieved.

The x, y, and z dimensions of a material are determined either visually or using microscopy, depending on the magnitude of the dimensions. The reported z dimension is, for example, the diameter of a sphere, the thickness of a coating, or the longest length of a prismatic shape.

DETAILED DESCRIPTION

Figure 1:
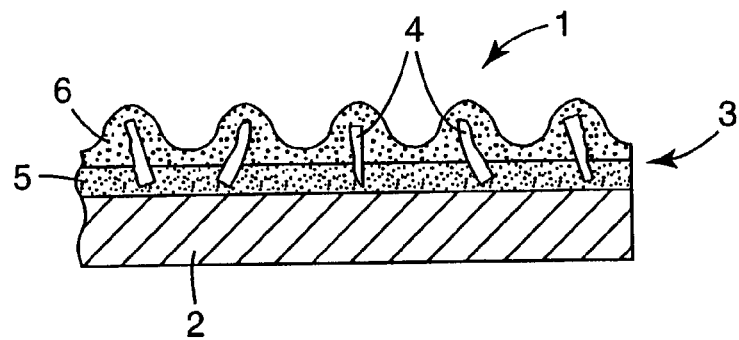
FIG. 1 is a fragmentary cross-sectional schematic view of a coated abrasive article including abrasive particles made according to a method of the present invention.

Some embodiments of the melt, amorphous materials (including glasses), and glass-ceramics made there from comprise at least 35 (in some embodiments, preferably at least 40, 45, 50, 55, 60, 65, or even at least 70; in some embodiments, preferably in a range from 60–70) percent by weight $Al_2O_3$, based on the total weight of the melt, amorphous material, or glass-ceramic, as applicable.

Some embodiments of the melt, amorphous materials (including glasses), and glass-ceramics made there from comprise $Al_2O_3$ ((in some embodiments, preferably comprise at least 20, 25, 30 35, 40, 45, 50, 55, 60, 65, or even at least 70; in some embodiments, preferably in a range from 60–70) percent by weight $Al_2O_3$, based on the total weight of the melt, amorphous material, or glass-ceramic, as applicable), $Y_2O_3$ ((in some embodiments, preferably comprise from 0 to 70 percent; in some embodiments, preferably in a range from 0 to 50 percent, more preferably 0 to 25 percent and most preferably 0 to 10 percent) by weight $Y_2O_3$, based on the total weight of the melt, amorphous material, or glass-ceramic, as applicable), and at feast one of $ZrO_2$ or $HfO_2$ (in some embodiments, preferably comprise from 0 to 70 percent; in some embodiments, preferably in a range from 0 to 50 percent, more preferably 0 to 25 percent and most preferably 0 to 10 percent), wherein at least 80 (in some embodiments, preferably, at least 85, 90, 95, 97, 98, 99, or even 100) percent by weight of the melt, amorphous material, and glass-ceramic, as applicable, collectively comprises the $Al_2O_3$, $Y_2O_3$, and at least one of $ZrO_2$ or $HfO_2$, based on the total weight of the melt, amorphous material, and glass-ceramic, as applicable.

Some embodiments of the melt, amorphous materials (including glasses), and glass-ceramics made there from comprise $Al_2O_3$ ((in some embodiments, preferably comprise at least 20, 25, 30 35, 40, 45, 50, 55, 60, 65, or even at least 70; in some embodiments, preferably in a range from 60–70) percent by weight $Al_2O_3$, based on the total weight of the melt, amorphous material, or glass-ceramic, as applicable), REO (in some embodiments, preferably comprise from 0 to 70 percent; in some embodiments, preferably in a range from 0 to 50 percent, more preferably 0 to 25 percent and most preferably 0 to 10 percent), and at least one of $ZrO_2$ or $HfO_2$ (in some embodiments, preferably comprise from 0 to 70 percent; in some embodiments, preferably in a range from 0 to 50 percent, more preferably 0 to 25 percent and most preferably 0 to 10 percent), wherein at least 80 (in some embodiments, preferably, at least 85, 90, 95, 97, 98, 99, or even 100) percent by weight of the melt, amorphous material, and glass-ceramic, as applicable collectively comprises the $Al_2O_3$, REO, and at least one of $ZrO_2$ or $HfO_2$, based on the total weight of the melt, amorphous material, and glass-ceramic, as applicable.

Some embodiments of the melt, amorphous materials (including glasses), and glass-ceramics made there from comprise $Al_2O_3$ ((in some embodiments, preferably comprise at least 20, 25, 30, 35, 40, 45, 50, 55, 60, 65, or even at least 70; in some embodiments, preferably in a range from 60–70) percent by weight $Al_2O_3$, based on the total weight of the melt, amorphous material, or glass-ceramic, as applicable), REO (in some embodiments, preferably comprise from 0 to 70 percent; in some embodiments, preferably in a range from 0 to 50 percent, more preferably 0 to 25 percent and most preferably 0 to 10 percent), $Y_2O_3$ (in some embodiments, preferably comprise from 0 to 70 percent; in some embodiments, preferably in a range from 0 to 50 percent, more preferably 0 to 25 percent and most preferably 0 to 10 percent), and at least one $ZrO_2$ or $HfO_2$ (in some embodiments, preferably comprise from 0 to 70; in some embodiments, preferably in a range from 0 to 50 percent, more preferably 0 to 25 percent and most preferably 0 to 10 percent), wherein at least 80 (in some embodiments, preferably, at least 85, 90, 95, 97, 98, 99, or even 100) percent by weight of the melt, amorphous material, and glass-ceramic, as applicable collectively comprises the $Al_2O_3$, REO, $Y_2O_3$, and at least one of $ZrO_2$ or $HfO_2$, based on the total weight of the melt, amorphous material, and glass-ceramic, as applicable.

Some embodiments of the melt, amorphous materials (including glasses), and glass-ceramics made there from comprise at least 20, 25, 30, 35, 40, 45, 50, 55, 60, 65, or even at least 70 (in some embodiments, preferably in a range from 60–70) percent by weight $Al_2O_3$ and from 0 to 70 percent (in some embodiments, preferably in a range from 0 to 50 percent, more preferably 0 to 25 percent and most preferably 0 to 10 percent) percent by weight $Y_2O_3$, based on the total weight of the melt, amorphous material, and glass-ceramic, as applicable.

Some embodiments of the melt, amorphous materials (including glasses), and glass-ceramics made there from comprise at least 20, 25, 30, 35, 40, 45, 50, 55, 60, 65, or even at least 70 (in some embodiments, preferably in a range from 60–70) percent by weight $Al_2O_3$ and from 0 to 70 percent (in some embodiments, preferably in a range from 0 to 50 percent, more preferably 0 to 25 percent and most preferably 0 to 10 percent) percent by weight REO, based on the total weight of the melt, amorphous material, and glass-ceramic, as applicable.

Some embodiments of the melt, amorphous materials (including glasses), and glass-ceramics made there from comprise $Al_2O_3$ (in some embodiments, preferably comprise at least 20, 25, 30, 35, 40, 45, 50, 55, 60, 65, or even at least 70; in some embodiments, preferably in a range from 60–70) percent by weight $Al_2O_3$, based on the total weight of the melt, amorphous material, or glass-ceramic, as applicable), REO (in some embodiments, preferably comprise from 0 to 70 percent; in some embodiments, preferably in a range from 0 to 50 percent, more preferably 0 to 25 percent and most preferably 0 to 10 percent), and at least one of $ZrO_2$ or $HfO_2$ (in some embodiments, preferably comprise from 0 to 70 percent; in some embodiments, preferably in a range from 0 to 50 percent, more preferably 0 to 25 percent and most preferably 0 to 10 percent), wherein at least 60 (in some embodiments, preferably, at least 65, 70, 75, 80, 85, 90, 95, 97, 98, 99, or even 100) percent by weight of the melt, amorphous material, and glass-ceramic, as applicable, respectively, collectively comprise the $Al_2O_3$, REO, and at least one of $ZrO_2$ or $HfO_2$, and less than 20 (in some embodiments, less than 15, 10, 5, or even zero) percent by weight $SiO2$ and less than 20 (in some embodiments, less than 15, 10, 5, or even zero) percent by weight $B_2O_3$, based on the total weight of the melt, amorphous material, and glass-ceramic, as applicable.

Some embodiments of the melt, amorphous materials (including glasses), and glass-ceramics made there from comprise $Al_2O_3$ (in some embodiments, preferably comprise at least 20, 25, 30, 35, 40, 45, 50, 55, 60, 65, or even at least 70) percent by weight $Al_2O_3$, based on the total weight of the melt, amorphous material, or glass-ceramic, as applicable), $Y_2O_3$ (in some embodiments, preferably comprise from 0 to 70 percent; in some embodiments, preferably in a range from 0 to 50 percent, more preferably 0 to 25 percent and most preferably 0 to 10 percent), and at least one of $ZrO_2$ or $HfO_2$ (in some embodiments, preferably comprise from 0 to 70 percent; in some embodiments, preferably in a range from 0 to 50 percent, more preferably 0 to 25 percent and most preferably 0 to 10 percent), wherein at least 60 (in some embodiments, preferably, at least 65, 70, 75, 80, 85, 90, 95, 97, 98, 99, or even 100) percent by weight of the melt, amorphous material, and glass-ceramic, as applicable, collectively comprise the $Al_2O_3$, $Y_2O_3$, and at least one of $ZrO_2$ or $HfO_2$, and less than 20 (in some embodiments, less than 15, 10, 5, or even zero) percent by weight $SiO_2$ and less than 20 (in some embodiments, less than 15, 10, 5, or even zero) percent by weight $B_2O_3$, based on the total weight of the melt, amorphous material, and glass-ceramic, as applicable.

Some embodiments of the melt, amorphous materials (including glasses), and glass-ceramics made there from comprise $Al_2O_3$ (in some embodiments, preferably comprise at least 20, 25, 30, 35, 40, 45, 50, 55, 60, 65, or even at least 70) percent by weight $Al_2O_3$, based on the total weight of the melt, amorphous material, or glass-ceramic, as applicable), REO (in some embodiments, preferably comprise from 0 to 70 percent; in some embodiments, preferably in a range from 0 to 50 percent, more preferably 0 to 25 percent and most preferably 0 to 10 percent), and at least one of $ZrO_2$ or $HfO_2$ (in some embodiments, preferably comprise from 0 to 70 percent; in some embodiments, preferably in a range from 0 to 50 percent, more preferably 0 to 25 percent and most preferably 0 to 10 percent), wherein at least 60 (in some embodiments, preferably, at least 65, 70, 75, 80, 85, 90, 95, 97, 98, 99, or even 100) percent by weight of the melt, amorphous material, and glass-ceramic, as applicable, collectively comprise the $Al_2O_3$, REO, and at least one of $ZrO_2$ or $HfO_2$, and less than 20 (in some embodiments, less than 15, 10, 5, or even zero) percent by weight SiO2, and less than 20 (in some embodiments, less than 15, 10, 5, or even zero) percent by weight $B_2O_3$, based on the total weight of the melt, amorphous material, and glass-ceramic, as applicable.

Some embodiments of the melt, amorphous materials (including glasses), and glass-ceramics made there from comprise $Al_2O_3$ (in some embodiments, preferably comprise at least 20, 25, 30, 35, 40, 45, 50, 55, 60, 65, or even at least 70) percent by weight $Al_2O_3$, based on the total weight of the melt, amorphous material, or glass-ceramic, as applicable), $Y_2O_3$ (in some embodiments, preferably comprise from 0 to 70 percent; in some embodiments, preferably in a range from 0 to 50 percent, more preferably 0 to 25 percent and most preferably 0 to 10 percent), and at least one of $ZrO_2$ or $HfO_2$ (in some embodiments, preferably comprise from 0 to 70 percent; in some embodiments, preferably in a range from 0 to 50 percent, more preferably 0 to 25 percent and most preferably 0 to 10 percent), wherein at least 60 (in some embodiments, preferably, at least 65, 70, 75, 80, 85, 90, 95, 97, 98, 99, or even 100) percent by weight of the melt, amorphous material, or glass-ceramic, as applicable, collectively comprise the $Al_2O_3$, $Y_2O_3$, and at least one of $ZrO_2$ or $HfO_2$, and less than 20 (in some embodiments, less than 15, 10, 5, or even zero) percent by weight $SiO_2$, and less than 20 (in some embodiments, less than 15, 10, 5, or even zero) percent by weight $B_2O_3$, based on the total weight of the melt, amorphous material, or glass-ceramic, as applicable.

Some embodiments of the melt, amorphous materials (including glasses), and glass-ceramics made there from comprise $Al_2O_3$ (in some embodiments, preferably comprise at least 20, 25, 30, 35, 40, 45, 50, 55, 60, 65, or even at least 70) percent by weight $Al_2O_3$, based on the total weight of the melt, amorphous material, or glass-ceramic, as applicable), $Y_2O_3$ (in some embodiments, preferably comprise from 0 to 70 percent; in some embodiments, preferably in a range from 0 to 50 percent, more preferably 0 to 25 percent and most preferably 0 to 10 percent), and at least one of $ZrO_2$ or $HfO_2$ (in some embodiments, preferably comprise from 0 to 70 percent; in some embodiments, preferably in a range from 0 to 50 percent, more preferably 0 to 25 percent and most preferably 0 to 10 percent), wherein at least 60 (in some embodiments, preferably, at least 65, 70, 75, 80, 85, 90, 95, 97, 98, 99, or even 100) percent by weight of the melt, amorphous material, or glass-ceramic, as applicable, collectively comprise the $Al_2O_3$, $Y_2O_3$, and at least one of $ZrO_2$ or $HfO_2$, and less than 40 (in some embodiments, less than 35, 30, 25, 20, 15, 10, 5, or even zero) percent by weight collectively $SiO_2$, $B_2O_3$, and $P_2O_5$, based on the total weight of the melt, amorphous material, or glass-ceramic, as applicable.

Optionally, if embodiments of the melt, amorphous materials (including glasses), and glass-ceramics made there from described herein do not already specify, embodiments of the melt, amorphous materials (including glasses), and glass-ceramics made there from contain less than 40 (in some embodiments, preferably less than 35, 30, 25, 20, 15, 10, 5, 4, 3, 2, 1, or even zero) percent by weight collectively $SiO_2$, $B_2O_3$, and $P_2O_5$, based on the total weight of the melt, amorphous material, or glass-ceramic, as applicable.

Optionally, if embodiments of the melt, amorphous materials (including glasses), and glass-ceramics made there from described herein do not already specify, embodiments of the melt, amorphous materials (including glasses), and glass-ceramics made there from may preferably contain not more than 20 (in some embodiments, less than 15, 10, 5, 4, 3, 2, 1, or even zero) percent by weight collectively $As_2O_3$, $B_2O_3$, $GeO_2$, $P_2O_5$, $SiO_2$, $TeO_2$, and $V_2O_5$, based on the total weight of the melt, amorphous material, or glass-ceramic, as applicable.

Typically, embodiments of the amorphous and glass-ceramics made there from have x, y, and z dimensions each perpendicular to each other, and wherein each of the x, y, and z dimensions is at least 10 micrometers, at least 25 micrometers, at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm.

The melt can be provided, for example, by heating (including in a flame or in a plasma) the appropriate metal oxide sources (including the particulate, metallic material comprising at least one of the metal, M, that has a negative enthalpy of oxide formation or an alloy thereof). The melt, which is preferably homogenous is rapidly cooled to provide the amorphous material. Although not wanting to be bound by theory, it is believed that the heat resulting from the exothermic reaction associated with the oxidation of the metal is beneficial in the formation of the melt and resulting amorphous material. For example, it is believed that the additional heat generated by the oxidation reaction within the raw material eliminates or minimizes insufficient heat transfer, and hence facilitates formation and homogeneity of the melt, particularly when forming amorphous particles over 150 micrometers in diameter. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or otherwise not practical due to high melting point of the materials. Further, the presence of the additional heat generated by the oxidation reaction actually enables the formation of amorphous material that otherwise could not be made, or could not be made in the desired size range. In forming the amorphous materials, it is desirable to provide an optimal residence time of the raw materials in the heat source. If the residence time is too short, insufficient melting may occur, and/or chemical reactions may not be completed. If the residence time is too long, although the melting and chemical reactions are complete, the molten material may cool more gradually during its trajectory through the heat source and thus the quench rate may be insufficient to provide the desired amorphous material. Desirable cooling rates include those of 50K/s and greater.

Some embodiments of the resulting amorphous materials are generally homogeneous. In another aspect, some embodiments of methods according to the present invention can provide a plurality of amorphous particles which are generally homogeneous relative to each other (e.g., their composition is relatively the same).

In some embodiments, the metal oxide sources (including the particulate, metallic material comprising at least one of the metal, M, that has a negative enthalpy of oxide formation or an alloy thereof) are agglomerated together into particles (i.e., the various raw materials are agglomerated together into particles).

The raw materials may be crystalline and/or amorphous. In some embodiments, the raw materials preferably have diameters in a range from about 20 to about 200 micrometers.

In some embodiments, the resulting material may desirably include metallic metal, M, dispersed within the resulting amorphous material. Typically, at least 95 or even 99 percent by weight of the metal, M, used to make the amorphous material is oxidized in making the amorphous material.

Typically, the particulate, metallic material has particle sizes in a range from about 10 micrometers to about 100 micrometers, although smaller or coarser particles may also be useful. Generally, coarser particles may not react completely while very fine metal particles tend to be more difficult to handle. The preferred particle size for the particulate, metallic material depends, for example, on the tendency of the metal to oxidize.

Typically, the particulate, metallic material comprises about 5 to about 75 percent by weight of the raw materials, although amounts outside of this range may also be useful. In general, if too little metal is added then the amount of heat released during the oxidation of the metal may be diluted. Alternatively, if too much metal is added then the oxidation (i.e., combustion) of the metal during melting may become too energetic and may lead to other undesirable processes such as volatilization and disintegration of the particles. In another aspect, the amount of metallic material present in the raw materials typically provides about 15% to about 50%, although higher amounts may also be useful, of the corresponding metal oxide, M oxide, present in the amorphous material. The desired amount of the particulate, metallic material used may depend, for example, on the tendency of the metal to oxidize, the size of the particles, the stiochiometry of the resulting metal oxide, and the heat released during the oxidation.

It is also within the scope of the present invention to utilize more than one metallic material comprising metal, M.

Useful amorphous material formulations include those at or near a eutectic composition(s) (e.g., binary and ternary eutectic compositions). In addition to compositions disclosed herein, other compositions, including quaternary and other higher order eutectic compositions, may be apparent to those skilled in the art after reviewing the present disclosure.

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide other metal oxides (e.g., $Dy_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Other useful metal oxide may also include, on a theoretical oxide basis, BaO, CaO, $Cr_2O_3$, CoO, $Fe_2O_3$, $GeO_2$, $Li_2O$, MgO, MnO, NiO, $Na_2O$, $Sc_2O_3$, SrO, $TiO_2$, ZnO, and combinations thereof. Sources, including commercial sources, include the oxides themselves, complex oxides, ores, carbonates, acetates, nitrates, chlorides, hydroxides, etc. These metal oxides are added to modify a physical property of the resulting abrasive particles and/or improve processing. These metal oxides are typically are added anywhere from 0 to 50% by weight, in some embodiments preferably 0 to 25% by weight and more preferably 0 to 50% by weight of the glass-ceramic depending, for example, upon the desired property.

The particular selection of metal oxide sources and other additives for making ceramics according to the present invention typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

In some instances, it may be preferred to incorporate limited amounts of metal oxides selected from the group consisting of: $Na_2O$, $P_2O_5$, $SiO_2$, $TeO_2$, $V_2O_3$, and combinations thereof. Sources, including commercial sources, include the oxides themselves, complex oxides, ores, carbonates, acetates, nitrates, chlorides, hydroxides, etc. These metal oxides may be added, for example, to modify a physical property of the resulting abrasive particles and/or improve processing. These metal oxides when used are typically are added from greater than 0 to 20% by weight, preferably greater than 0 to 5% by weight and more preferably greater than 0 to 2% by weight of the glass-ceramic depending, for example, upon the desired property.

The addition of certain metal oxides may alter the properties and/or crystalline structure or microstructure of a glass-ceramic, as well as the processing of the raw materials and intermediates in making the glass-ceramic. For example, oxide additions such as MgO, CaO, $Li_2O$, and $Na_2O$ have been observed to alter both the $T_g$ (for a glass) and $T_x$ (wherein $T_x$ is the crystallization temperature) of amorphous material. Although not wishing to be bound by theory, it is believed that such additions influence glass formation. Further, for example, such oxide additions may decrease the melting temperature of the overall system (i.e., drive the system toward lower melting eutectic), and ease of amorphous material-formation. Complex eutectics in multi component systems (quaternary, etc.) may result in better amorphous material-forming ability. The viscosity of the liquid melt and viscosity of the glass in its "working" range may also be affected by the addition of certain metal oxides such as MgO, CaO, $Li_2O$, and $Na_2O$. It is also within the scope of the present invention to incorporate at least one of halogens (e.g., fluorine and chlorine), or chalcogenides (e.g., sulfides, selenides, and tellurides) into the amorphous materials, and the glass-ceramics made there from.

Crystallization of the amorphous material and ceramic comprising the amorphous material may also be affected by the additions of certain materials. For example, certain metals, metal oxides (e.g., titanates and zirconates), and fluorides, for example, may act as nucleation agents resulting in beneficial heterogeneous nucleation of crystals. Also, addition of some oxides may change nature of metastable phases devitrifying from the amorphous material upon reheating. In another aspect, for ceramics comprising crystalline $ZrO_2$, it may be desirable to add metal oxides (e.g., $y_2O_3$, $TiO_2$, CaO, and MgO) that are known to stabilize tetragonal/cubic form of $ZrO_2$.

The particular selection of metal oxide sources and other additives for making the ceramics typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

For additional details regarding plasma spraying, see, for example, copending application having U.S. Ser. No. 10/211,640, filed the same date as the instant application, the disclosure of which is incorporated herein by reference.

Rapid cooling may also be conducted under controlled atmospheres, such as a reducing, neutral, or oxidizing environment to maintain and/or influence the desired oxidation states, etc. during cooling. The atmosphere can also influence amorphous material formation by influencing crystallization kinetics from undercooled liquid. For example, larger undercooling of $Al_2O_3$ melts without crystallization has been reported in argon atmosphere as compared to that in air.

The microstructure or phase composition (glassy/amorphous/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous yield can be calculated for beads using a −100+120 mesh size fraction (i.e., the fraction collected between 150-micrometer opening size and 125-micrometer opening size screens). The measurements are done in the following manner. A single layer of beads is spread out upon a glass slide. The beads are observed using an optical microscope. Using the crosshairs in the optical microscope eyepiece as a guide, beads that lay along a straight line are counted either amorphous or crystalline depending on their optical clarity. A total of 500 beads are counted and a percent amorphous yield is determined by the amount of amorphous beads divided by total beads counted.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, an XRD can be used qualitatively to determine types of phases. The presence of a broad diffused intensity peak is taken as an indication of the amorphous nature of a material. The existence of both a broad peak and well-defined peaks is taken as an indication of existence of crystalline matter within an amorphous matrix.

The initially formed amorphous material or ceramic (including glass prior to crystallization) may be larger in size than that desired. The amorphous material or ceramic can be converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are of the desired size may be recrushed if they are too large, or "recycled" and used as a raw material for re-melting if they are too small.

The shape of the ceramic (including glass prior to crystallization) may depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For some particles (e.g., abrasive particles) an average aspect ratio ranging from 1:1 to 5:1 is typically desired, and in some embodiments 1.25:1 to 3:1, or even 1.5:1 to 2.5:1.

It is also within the scope of the present invention, for example, to directly form ceramic (including glass prior to crystallization) may in desired shapes. For example, ceramic (including glass prior to crystallization) may be formed (including molded) by pouring or forming the melt into a mold.

It is also within the scope of the present invention, for example, to fabricate the ceramic (including glass prior to crystallization) by coalescing. This coalescing step, in essence, forms a larger sized body from two or more smaller particles. For example, amorphous material comprising particles (obtained, for example, by crushing) (including beads and microspheres), fibers, etc. may formed into a larger particle size. For example, ceramic (including glass prior to crystallization), may also be provided by heating, for example, particles comprising the amorphous material, and/or fibers, etc. above the $T_g$ such that the particles, etc. coalesce to form a shape and cooling the coalesced shape. The temperature and pressure used for coalescing may depend, for example, upon composition of the amorphous material and the desired density of the resulting material. The temperature should be below glass crystallization temperature, and for glasses, greater than the glass transition temperature. In certain embodiments, the heating is conducted at at least one temperature in a range of about 850° C. to about 1100° C. (in some embodiments, preferably 900° C. to 1000° C.). Typically, the amorphous material is under pressure (e.g., greater than zero to 1 GPa or more) during coalescence to aid the coalescence of the amorphous material. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressure, hot extrusion and the like. Typically, it is generally preferred to cool the resulting coalesced body before further heat treatment. After heat treatment if so desired, the coalesced body may be crushed to smaller particle sizes or a desired particle size distribution.

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material. Optionally, the resulting, coalesced article can be heat-treated to provide glass-ceramic, crystalline ceramic, or ceramic otherwise comprising crystalline ceramic.

Coalescence of the amorphous material and/or glass-ceramic (e.g., particles) may also be accomplished by a variety of methods, including pressureless or pressure sintering (e.g., sintering, plasma assisted sintering, hot pressing, HIPing, hot forging, hot extrusion, etc.).

Heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment can be conducted continuously, for example, using rotary kilns. In the case of a rotary kiln, the material is fed directly into a kiln operating at the elevated temperature. The time at the elevated temperature may range from a few seconds (in some embodiments even less than 5 seconds) to a few minutes to several hours. The temperature may range anywhere from 900° C. to 1600° C., typically between 1200° C. to 1500° C. It is also within the scope of the present invention to perform some of the heat-treatment in batches (e.g., for the nucleation step) and another continuously (e.g., for the crystal growth step and to achieve the desired density). For the nucleation step, the temperature typically ranges between about 900° C. to about 1100° C., in some embodiments, preferably in a range from about 925° C. to about 1050° C. Likewise for the density step, the temperature typically is in a range from about 1100° C. to about 1600° C., in some embodiments, preferably in a range from about 1200° C. to about 1500° C. This heat treatment may occur, for example, by feeding the material directly into a furnace at the elevated temperature. Alternatively, for example, the material may be feed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for example, it may be desirable to heat-treat under gas pressure as in, for example, hot-isostatic press, or in gas pressure furnace. It is within the scope of the present invention to convert (e.g., crush) the resulting article or heat-treated article to provide particles (e.g., abrasive particles).

The amorphous material is heat-treated to at least partially crystallize the amorphous material to provide glass-ceramic. The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art. One skilled in the art, after reading the disclosure of the present invention should be able to provide TTT curves for amorphous materials made according to the present invention, determine the appropriate nucleation and/or crystal growth conditions to provide glass-ceramics of the abrasive particles.

Typically, glass-ceramics are stronger than the amorphous materials from which they are formed. Hence, the strength of the material may be adjusted, for example, by the degree to which the amorphous material is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, Glass-Ceramics, P. W. McMillan, Academic Press, Inc., $2^{nd}$ edition, 1979, the disclosure of which is incorporated herein by reference.

For example, during heat-treatment of some exemplary amorphous materials made according to methods according to present invention for making the glass-ceramics, formation of phases such as $La_2Zr_2O_7$, and, if $ZrO_2$ is present, cubic/tetragonal $ZrO_2$, in some cases monoclinic $ZrO_2$, have been observed at temperatures above about 900° C. Although not wanting to be bound by theory, it is believed that zirconia-related phases are the first phases to nucleate from the amorphous material. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10–15 nanometers have been observed. For at least some embodiments, heat-treatment at about 1300° C. for about 1 hour provides a full crystallization. In generally, heat-treatment times for each of the nucleation and crystal growth steps may range of a few seconds (in some embodiments even less than 5 seconds) to several minutes to an hour or more.

The size of the resulting crystals can typically controlled at least in part by the nucleation and/or crystallization times and/or temperatures. Although it is generally preferred to have small crystals (e.g., on the order not greater than a micrometer, or even not greater than a nanometer) the glass-ceramics may be made with larger crystal sizes (e.g., at least 1–10 micrometers, at least 10–25 micrometers, at least 50–100 micrometers, or even grater than 100 micrometers). Although not wanting to be bound by theory, it is generally believed in the art that the finer the size of the crystals (for the same density), the higher the mechanical properties (e.g., hardness and strength) of the ceramic.

Examples of crystalline phases which may be present in embodiments of glass-ceramics include: $Al_2O_3$ (e.g., $\alpha$-$Al_2O_3$), $Y_2O_3$, REO, $HfO_2$ $ZrO_2$ (e.g., cubic $ZrO_2$ and tetragonal $ZrO_2$), BaO, CaO, $Cr_2O_3$, CoO, $Fe_2O_3$, $GeO_2$, $Li_2O$, MgO, MnO, NiO, $Na_2O$, $P_2O_5$, $Sc_2O_3$, $SiO_2$, SrO, $TeO_2$, $TiO_2$, $V_2O_3$, $Y_2O_3$, ZnO, "complex metal oxides" (including "complex $Al_2O_3$.metal oxide (e.g., complex $Al_2O_3$.REO (e.g., $ReAlO_3$ (e.g., $GdAlO_3$ $LaAlO_3$), $ReA_{11}O_{18}$ (e.g., $LaAl_{11}O_{18}$.), and $Re_3Al_5O_{12}$ (e.g., $Dy_3Al_5O_{12}$)), complex $Al_2O_3$.$Y_2O_3$ (e.g., $Y_3Al5O_{12}$), and complex $ZrO_2$.REO (e.g., $Re_2Zr_2O_7$ (e.g., $La_2Zr_2O_7$))), and combinations thereof It is also with in the scope of the present invention to substitute a portion of the yttrium and/or aluminum cations in a complex $Al_2O_3$.metal oxide (e.g., complex $Al_2O_3$.$Y_2O_3$ (e.g., yttrium aluminate exhibiting a garnet crystal structure)) with other cations. For example, a portion of the Al cations in a complex $Al_2O_3$.$Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3$.$Y_2O_3$ may be substituted with at least one cation of an element selected from the group consisting of: Ce, Dy, Er, Eu, Gd, Ho; La, Lu, Nd, Pr, Sm, Th, Tm, Yb, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

It is also with in the scope of the present invention to substitute a portion of the rare earth and/or aluminum cations in a complex $Al_2O_3$.metal oxide (e.g., complex $Al_2O_3$.REO) with other cations. For example, a portion of the Al cations in a complex $Al_2O_3$.REO may be substituted with at least one cation of an element selected from the group consisting of: Cr, Ti, Sc, Fe, Mg, Ca, Si, Co, and combinations thereof. For example, a portion of the Y cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15,9, 3, and 1-micrometer slurries. The mounted and polished sample is sputtered with a thin layer of gold-palladium and viewed using a scanning electron microscopy (such as the JEOL SEM Model JSM 840A). A typical back-scattered electron (BSE) micrograph of the microstructure found in the sample is used to determine $$\text{Average Crystal Size} = \frac{1.5}{N_L M}$$

Where $N_L$ is the number of crystals intersected per unit length and M is the magnification of the micrograph.

Some embodiments of the glass-ceramics include glass-ceramics comprising alpha alumina having at least one of an average crystal size not greater than 150 nanometers.

Some embodiments of the glass-ceramics include glass-ceramics comprising alpha alumina, wherein at least 75 (in some embodiments preferably, 80, 85, 90, 95, or even 100) percent by number of the alpha alumina present have crystal sizes not greater than 200 nanometers.

Some embodiments of the glass-ceramics include glass-ceramics comprising alpha $Al_2O_3$, crystalline $ZrO_2$, and a first complex $Al_2O_3$.$Y_2O_3$, and wherein at least one of the alpha $Al_2O_3$, the crystalline $ZrO_2$, or the first complex $Al_2O_3$.$Y_2O_3$ has an average crystal size not greater than 150 nanometers. In some embodiments preferably, the glass-ceramics further comprise a second, different complex $Al_2O_3$.$Y_2O_3$. In some embodiments preferably, the glass-ceramics further comprise a complex $Al_2O_3$.REO.

Some embodiments of the glass-ceramics include glass-ceramics comprising a first complex $Al_2O_3$.$Y_2O_3$, a second, different complex $Al_2O_3$.$Y_2O_3$, and crystalline $ZrO_2$, and wherein for at least one of the first complex $Al_2O_3$.$Y_2O_3$, the second complex $Al_2O_3$.$Y_2O_3$, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a second, different complex $Al_2O_3$.$Y_2O_3$. In some embodiments preferably, the glass-ceramics further comprise a complex $Al_2O_3$.REO.

Some embodiments of the glass-ceramics include glass-ceramics comprising alpha $Al_2O_3$, crystalline $ZrO_2$, and a first complex $Al_2O_3$.REO, and wherein at least one of the alpha $Al_2O_3$, the crystalline $ZrO_2$, or the first complex $Al_2O_3$.REO has an average crystal size not greater than 150 nanometers. In some embodiments preferably, the glass-ceramics further comprise a second, different complex $Al_2O_3.REO$. In some embodiments preferably, the glass-ceramics further comprise a complex $Al_2O_3.Y_2O_3$.

Some embodiments of the glass-ceramics include glass-ceramics comprising a first complex $Al_2O_3.REO$, a second, different complex $Al_2O_3.REO$, and crystalline $ZrO_2$, and wherein for at least one of the first complex $Al_2O_3.REO$, the second complex $Al_2O_3.REO$, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a complex $Al_2O_3.Y_2O_3$.

Some embodiments of the glass-ceramics include glass-ceramics comprising a first complex $Al_2O_3.Y_2O_3$, a second, different complex $Al_2O_3Y_2O_3$, and crystalline $ZrO_2$, and wherein for at least one of the first complex $Al_2O_3.Y_2O_3$, the second, different complex $Al_2O_3.Y_2O_3$, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a complex $Al_2O_3.REO$.

Some embodiments of the glass-ceramics include glass-ceramics comprising a first complex $Al_2O_3.Y_2O_3$, a second, different complex $Al_2O_3.Y_2O_3$, and crystalline $ZrO_2$, and wherein for at least one of the first complex $Al_2O_3.Y_2O_3$, the second, different complex $Al_2O_3.Y_2O_3$, or the crystalline $ZrO_2$, at least 75 (in some embodiments preferably, 80 85, 90, 95, or even 100) percent by number of the crystal sizes thereof are not greater than 200 nanometers. In some embodiments preferably, the glass-ceramics further comprise a complex $Al_2O_3.REO$.

Some embodiments of the glass-ceramics include glass-ceramics comprising a first complex $Al_2O_3.REO$, a second, different complex $Al_2O_3.REO$, and crystalline $ZrO_2$, and wherein at least one of the first complex $Al_2O_3.REO$, the second, different complex $Al_2O_3.REO$, or the crystalline $ZrO_2$ has an average crystal size not greater than 150 nanometers. In some embodiments preferably, the glass-ceramics further comprise a second, different complex $Al_2O_3.REO$. In some embodiments preferably, the glass-ceramics further comprise a complex $Al_2O_3.Y_2O_3$.

Some embodiments of the glass-ceramics include glass-ceramics comprising a first complex $Al_2O_3.REO$, a second, different complex $Al_2O_3.REO$, and crystalline $ZrO_2$, and wherein for at least one of the first complex $Al_2O_3.REO$, the second, different complex $Al_2O_3.REO$, or the crystalline $ZrO_2$, at least 75. (in some embodiments preferably, 80, 85, 90, 95, or even 100) percent by number of the crystal sizes thereof are not greater than 200 nanometers. In some embodiments preferably, the glass-ceramics further comprise a complex $Al_2O_3.Y_2O_3$.

In some embodiments, glass-ceramics of the abrasive particles comprise at least 75, 80, 85, 90, 95, 97, 98, 99, or even 100 percent by volume crystallites, wherein the crystallites have an average size of less than 1 micrometer. In some embodiments, glass-ceramics of the abrasive particles comprise at least 75, 80, 85, 90, 95, 97, 98, 99, or even 100 percent by volume crystallites, wherein the crystallites have an average size not greater than 0.5 micrometer. In some embodiments, glass-ceramics of the abrasive particles comprise at least 75, 80, 85, 90, 95, 97, 98, 99, or even 100 percent by volume crystallites, wherein the crystallites have an average size not greater than 0.3 micrometer. In some embodiments, the glass-ceramics comprise at least 75, 80, 85, 90, 95, 97, 98, 99, or even 100 percent by volume crystallites, wherein the crystallites have an average size not greater than 0.15 micrometer.

Crystals formed by heat-treating amorphous material made according to methods of the present invention to provide embodiments of glass-ceramics may be, for example, equiaxed, columnar, or flattened splat-like features.

Typically, the (true) density, sometimes referred to as specific gravity, of ceramics made according to methods of the present invention is at least 70% of theoretical density. More desirably, the (true) density of ceramics made according to methods of the present invention is at least 75%, 80%, 85%, 90%, 92%, 95%, 96%, 97%, 98%, 99%, 99.5% or even 100% of theoretical density. The abrasive particles have (true) densities of at least 85%, 90%, 92%, 95%, 96%, 97%, 98%, 99%, 99.5% or even 100% of theoretical density.

The average hardness of the material of the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference.

In some embodiments, the average hardness of glass-ceramics made according to methods of the present invention is at least 12, 13, 14, 15, 16, 17, or even at least 18 GPa), Abrasive particles made according to the present invention have an average hardness of at least 15 GPa, in some embodiments, at least 16 GPa, at least 17 GPa, or even at least 18 GPa.

Additional details regarding amorphous materials, glass-ceramics, including making, using, and properties thereof, can be found in application having U.S. Ser. Nos. 09/922,526, 09/922,527, and 09/922,530, filed Aug. 2, 2001, and U.S. Ser. Nos. 10/211,598; 10/211,630; 10/211,639; 10/211,034; 10/211,044; 10/211/628; 10/211,640; and 10/211,684, filed the same date as the instant application, the disclosures of which are incorporated herein by reference.

Abrasive particles made by methods according to the present invention generally comprise crystalline ceramic (in some embodiments, preferably at least 75, 80, 85, 90, 91, 92, 93, 94, 95, 96, 97, 98, 99, 99.5, or even 100 percent by volume) crystalline ceramic.

The abrasive particles can be incorporated into an abrasive article, or in loose form. The abrasive articles comprise binder and a plurality of abrasive particles, wherein at least a portion of the abrasive particles are the abrasive particles made by a method according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, preferably, at least 5, 10, 15, 20, 25, 30, 35, 40, 45, 50, 55, 60, 65, 70, 75, 80, 85, 90, 95, or even 100 percent by weight of the abrasive particles in an abrasive article are the abrasive particles made by a method according to the present invention, based on the total weight of the abrasive particles in the abrasive article.

Abrasive particles are usually graded to a given particle size distribution before use. Such distributions typically have a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles made by a method according to the present invention. In some embodiments, preferably, at least 5, 10, 15, 20, 25, 30, 35, 40, 45, 50, 55, 60, 65, 70, 75, 80, 85, 90, 95, or even 100 percent by weight of the plurality of abrasive particles are the abrasive particles made by a method according to the present invention, based on the total weight of the plurality of abrasive particles.

ANSI grade designations include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. Preferred ANSI grades comprising abrasive particles according to the present invention are ANSI 8–220. FEPA grade designations include P8, P12, P16, P24, P36, P40, P50, P60, P80, P100, P120, P150, P180, P220, P320, P400, P500, P600, P800, P 1000, and P 1200. Preferred FEPA grades comprising abrasive particles according to the present invention are P12–P220. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS 10,000. Preferred JIS grades comprising abrasive particles according to the present invention are JIS8-220.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form amorphous material. This recycling may occur after the crushing step, where the particles are in large chunks or smaller pieces (sometimes referred to as "fines") that have not been screened to a particular distribution.

In another aspect, the present invention provides a method for making abrasive particles, the method comprising heat-treating amorphous (e.g., glass) comprising particles such that at least a portion of the amorphous material converts to glass-ceramic to provide abrasive particles comprising the glass-ceramic. The present invention also provides a method for making abrasive particles comprising a glass-ceramic, the method comprising heat-treating amorphous material such that at least a portion of the amorphous material converts to glass-ceramic, and crushing the resulting heat-treated material to provide the abrasive particles. When crushed, glass tends to provide sharper particles than crushing significantly crystallized glass-ceramics or crystalline material.

In another aspect, the present invention provides agglomerate abrasive grains each comprise a plurality of abrasive particles made by a method according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) made by a method according to the present invention. Methods of making such abrasive articles and using abrasive articles using abrasive particles are well known to those skilled in the art. Furthermore, abrasive particles made by a method according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

An example of a coated abrasive article is depicted in FIG. 1. Referring to this figure, coated abrasive article according to the present invention 1 has a backing (substrate) 2 and abrasive layer 3. Abrasive layer 3 includes abrasive particles made by a method according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3–50% by volume bond material, about 30–90% by volume abrasive particles (or abrasive particle blends), up to 50% by volume additives (including grinding aids), and up to 70% by volume pores, based on the total volume of the bonded abrasive article.

Figure 2:
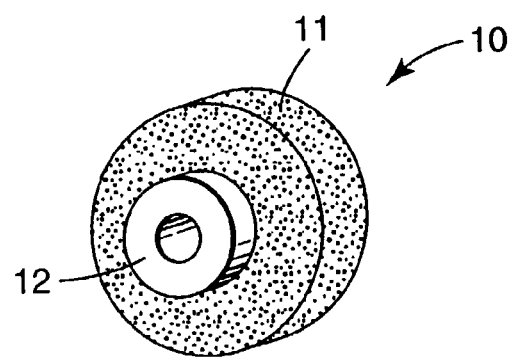
FIG. 2 is a perspective view of a bonded abrasive article including abrasive particles made according to a method of the present invention.

A preferred form is a grinding wheel. Referring to FIG. 2, grinding wheel 10 is depicted, which includes abrasive particles made by a method according to the present invention 11, molded in a wheel and mounted on hub 12.

Figure 3:
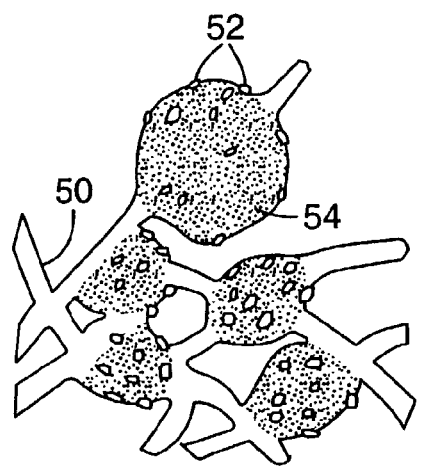
FIG. 3 is an enlarged schematic view of a nonwoven abrasive article including abrasive particles made according to a method of the present invention.

Nonwoven abrasive articles typically include an open porous lofty polymer filament structure having abrasive particles made by a method according to the present invention distributed throughout the structure and adherently bonded therein by an organic binder. Examples of filaments include polyester fibers, polyamide fibers, and polyaramid fibers. In FIG. 3, a schematic depiction, enlarged about 100x, of a typical nonwoven abrasive article is provided. Such a nonwoven abrasive article according to the present invention comprises fibrous mat 50 as a substrate, onto which abrasive particles made by a method according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles may be in the shape of a wheel (including cut off wheels), honing stone, mounted pointed or other conventional bonded abrasive shape. A preferred vitrified bonded abrasive article is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

Preferred vitrified bonding materials may include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect. The preferred grinding aid is cryolite; the most preferred grinding aid is potassium tetrafluoroborate.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50–300 $g/m^2$ (desirably, about 80–160 $g/m^2$). In vitrified bonded abrasive articles grinding aid is typically impregnated into the pores of the article.

The abrasive articles can contain 100% abrasive particles made by a method according to the present invention, or blends of such abrasive particles with other abrasive particles and/or diluent particles. However, at least about 2% by weight, desirably at least about 5% by weight, and more desirably about 30–100% by weight, of the abrasive particles in the abrasive articles should be abrasive particles made by a method according to the present invention. In some instances, the abrasive particles made by a method according to the present invention may be blended with another abrasive particles andlor diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. Additional details concerning fused abrasive particles, can be found, for example, in U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.), U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), U.S. Pat. No. 5,023,212 (Dubots et al.), U.S. Pat. No. 5,143,522 (Gibson et al.), and U.S. Pat. No. 5,336,280 (Dubots et al.). and applications having U.S. Ser. Nos. 09/495,978, 09/496,422, 09/496,638, and 09/496,713, each filed on Feb. 2, 2000, and, U.S. Ser. Nos. 09/618,876, 09/618,879, 09/619,106, 09/619,191, 09/619,192, 09/619,215, 09/619,289, 09/619,563, 09/619,729, 09/619,744, and 09/620,262, each filed on Jul. 19, 2000, and U.S. Ser. No. 09/772,730, filed Jan. 30, 2001, the disclosures of which are incorporated herein by reference. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles made by a method according to the present invention, with the smaller sized particles being another abrasive particle type. Conversely, for example, the smaller sized abrasive particles may be abrasive particles made by a method according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles made by a method according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444 and 09/688,484, filed Oct. 16, 2000, the disclosures of which are incorporated herein by reference.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles made by a method according to the present invention, and the second (outermost) layer comprises abrasive particles made by a method according to the present invention. Likewise in a bonded abrasive, there may be two distinct sections of the grinding wheel. The outermost section may comprise abrasive particles made by a method according to the present invention, whereas the innermost section does not. Alternatively, abrasive particles made by a method according to the present invention may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christianson), the disclosures of which are incorporated herein by reference. Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.) the disclosures of which are incorporated herein by reference. Further details regarding vitreous bonded abrasives can be found, for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive articles can be found, for example, in U.S. Pat. No. 2,958,593 (Hoover et al.), the disclosure of which is incorporated herein by reference.

The present invention provides a method of abrading a surface, the method comprising contacting at least one abrasive particle made by a method according to the present invention, with a surface of a workpiece; and moving at least of one the abrasive particle or the contacted surface to abrade at least a portion of said surface with the abrasive particle. Methods for abrading with abrasive particles made by a method according to the present invention range of snagging (i.e., high pressure high stock removal) to polishing (e.g., polishing medical implants with coated abrasive belts), wherein the latter is typically done with finer grades (e.g., less ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles made by a method according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles made by a method according to the present invention may be used to abrade workpieces such as aluminum metal, carbon steels, mild steels, tool steels, stainless steel, hardened steel, titanium, glass, ceramics, wood, wood like materials, paint, painted surfaces, organic coated surfaces and the like. The applied force during abrading typically ranges from about 1 to about 100 kilograms.

Embodiments of particulate amorphous and glass-ceramics made according to a method of the present invention may be useful, for example, as fillers in polymeric, metallic, or ceramic matrix composites, as feed particles for plasma spraying, or raw materials for forming ceramic materials. Transparent forms may be used as retro-reflective beads. Embodiments of particulate amorphous and glass-ceramics made according to a method of the present invention may be viscoelastically deformed into simple or complex shaped bulk materials.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, and $V_2O_5$.

EXAMPLES

Examples 1–6 and Comparative Examples A, B, and C

A 250-ml polyethylene bottle (7.3-cm diameter) was charged with a 50-gram mixture of various powders (as shown below in Table 1, with sources of the raw materials listed in Table 2), 75 grams of isopropyl alcohol, and 200 grams of alumina milling media (cylindrical in shape, both height and diameter of 0.635 cm; 99.9% alumina; obtained from Coors, Golden Colo.). The contents of the polyethylene bottle were milled for 16 hours at 60 revolutions per minute (rpm). After the milling, the milling media were removed and the slurry was poured onto a warm (approximately 75° C.) glass ("PYREX") pan and dried. The dried mixture was screened through a 70-mesh screen ((212-micrometer opening size) with the aid of a paint brush.

After grinding and screening, the mixture of milled feed particles was fed slowly (0.5 gram/minute) into a hydrogen/oxygen torch flame to melt the particles. The torch used to melt the particles, thereby generating molten droplets, was a Bethlehem bench burner PM2D Model B obtained from Bethlehem Apparatus Co., Hellertown, Pa. Hydrogen and oxygen flow rates for the torch were as follows. For the inner ring, the hydrogen flow rate was 8 standard liters per minute (SLPM) and the oxygen flow rate was 3.5 SLPM. For the outer ring, the hydrogen flow rate was 23 SLPM and the oxygen flow rate was 12 SLPM. The dried and sized particles were fed slowly (0.5 gram/minute) into the torch flame which melted the particles and carried them on to an inclined stainless steel surface (approximately 51 centimeters (20 inches) wide with a slope angle of 45 degrees) with cold water running over (approximately 8 liters/minute) the surface to rapidly quench the molten droplets. The resulting molten and quenched beads were collected in a pan and dried at 110° C. The particles were spherical in shape and varied in size from a few micrometers (i.e., microns) up to 250 micrometers and were either transparent (i.e., amorphous) and/or opaque (i.e., crystalline).

A percent amorphous yield was calculated from the resulting flame-formed beads using a −100+120 mesh size fraction (i.e., the fraction collected between 150-micrometer opening size and 125-micrometer opening size screens). The measurements were done in the following manner. A single layer of beads was spread out upon a glass slide. The beads were observed using an optical microscope. Using the crosshairs in the optical microscope eyepiece as a guide, beads that lay along a straight line were counted either amorphous or crystalline depending on their optical clarity. A total of 500 beads were counted and a percent amorphous yield was determined by the amount of amorphous beads divided by total beads counted.

TABLE 1

| Example | Batch amounts, g | Weight percent of components | Final weight percent alumina % | Percent final alumina from Al metal | Percent amorphous yield |
|---|---|---|---|---|---|
| Comp. A | $Al_2O_3$: 30<br>Al: 0.0<br>$La_2O_3$: 13.8<br>$ZrO_2$: 6.2 | $Al_2O_3$: 60.0<br>Al: 0.0<br>$La_2O_3$: 28.0<br>$ZrO_2$: 12.0 | 60 | 0 | 9 |

TABLE 1-continued

| Example | Batch amounts, g | Weight percent of components | Final weight percent alumina % | Percent final alumina from Al metal | Percent amorphous yield |
|---|---|---|---|---|---|
| Ex. 1 | $Al_2O_3$: 21.6<br>Al: 6.2<br>$La_2O_3$: 15.3<br>$ZrO_2$: 6.9 | $Al_2O_3$: 43.0<br>Al: 12.0<br>$La_2O_3$: 31.0<br>$ZrO_2$: 14.0 | 60 | 35 | 22 |
| Ex. 2 | $Al_2O_3$: 6.1<br>Al: 17.6<br>$La_2O_3$: 18.2<br>$ZrO_2$: 8.1 | $Al_2O_3$: 12.0<br>Al: 35.0<br>$La_2O_3$: 36.0<br>$ZrO_2$: 16.0 | 60 | 85 | 91 |
| Comp. B | $Al_2O_3$: 25.0<br>Al: 0.0<br>$La_2O_3$: 17.3<br>$ZrO_2$: 7.7 | $Al_2O_3$: 50.0<br>Al: 0.0<br>$La_2O_3$: 35.0<br>$ZrO_2$: 15.0 | 50 | 0 | 27 |
| Ex. 3 | $Al_2O_3$: 9.0<br>Al: 11.1<br>$La_2O_3$: 20.7<br>$ZrO_2$: 9.2 | $Al_2O_3$: 18.0<br>Al: 22.0<br>$La_2O_3$: 41.0<br>$ZrO_2$: 18.0 | 50 | 70 | 94 |
| Comp. C | $Al_2O_3$: 35.0<br>Al: 0.0<br>$La_2O_3$: 10.4<br>$ZrO_2$: 4.6 | $Al_2O_3$: 70.0<br>Al: 0.0<br>$La_2O_3$: 21.0<br>$ZrO_2$: 9.0 | 70 | 0 | 3 |
| Ex. 4 | $Al_2O_3$: 13.6<br>Al: 16.9<br>$La_2O_3$: 13.5<br>$ZrO_2$: 6.0 | $Al_2O_3$: 27.0<br>Al: 34.0<br>$La_2O_3$: 27.0<br>$ZrO_2$: 12.0 | 70 | 70 | 25 |
| Ex. 5 | $Al_2O_3$: 16.1<br>Al: 4.6<br>$La_2O_3$: 20.2<br>$ZrO_2$: 9.0 | $Al_2O_3$: 32.0<br>Al: 9.0<br>$La_2O_3$: 41.0<br>$ZrO_2$: 18.0 | 45.8 | 35 | 97 |
| Ex. 6 | $Al_2O_3$: 27.5<br>Al: 7.8<br>$La_2O_3$: 10.2<br>$ZrO_2$: 4.5 | $Al_2O_3$: 55.0<br>Al: 16.0<br>$La_2O_3$: 20.0<br>$ZrO_2$: 9.0 | 74.1 | 35 | 6 |

TABLE 2

| Raw Material | Source |
|---|---|
| Alumina particles ($Al_2O_3$) | Obtained from Alcoa Industrial Chemicals, Bauxite, AR, under the trade designation "A16SG" |
| Aluminum particles (Al) | Obtained from Alfa Aesar, Ward Hill, MA |
| Lanthanum oxide particles ($La_2O_3$) | Obtained from Molycorp Inc., Mountain Pass, CA and calcined at 700° C. for 6 hours prior to batch mixing |
| Zirconium particles ($ZrO_2$) | Obtained from Zirconia Sales, Inc. of Marietta, GA under the trade designation "DK-2" |

Examples 7 and 8 and Comparative Examples D and E

Examples 7 and 8 and Comparative Examples D and E beads were prepared as described above in Examples 1–6 and Comparative Examples A, B, and C, except the amounts of raw material used are listed in Table 3, raw material sources are listed in Table 4, and the hydrogen torch was aimed directly into a 19-liter (5-gallon) cylindrical container (30 centimeters (cm) diameter by 34 cm height) of continuously circulating, turbulent water to rapidly quench the molten droplets. The angle at which the flame hit the water was approximately 45°, and the flame length, burner to water surface, was approximately 18 centimeters (cm). A percent amorphous yield was calculated from the resulting flame-formed beads using the same method as that used for Examples 1–6 and Comparative Examples A, B, C. The percent amorphous yield data for Examples 7 and 8 and Comparative Examples D and E are listed in Table 3 along with the composition information.

TABLE 3

| Example | Batch amounts, g | Weight percent of components | Final weight percent alumina % | Percent final alumina from Al metal | Percent amorphous yield |
|---|---|---|---|---|---|
| Comp. D | $Al_2O_3$: 31.8<br>Al: 0.0<br>$ZrO_2$: 18.3 | $Al_2O_3$: 63.5<br>Al: 0.0<br>$ZrO_2$: 36.5 | 63.5 | 0 | 39 |
| Comp. E | $Al_2O_3$: 29.3<br>Al: 0.0<br>$ZrO_2$: 20.8 | $Al_2O_3$: 58.5<br>Al: 0.0<br>$ZrO_2$: 41.5 | 58.5 | 0 | 45 |
| Ex. 7 | $Al_2O_3$: 18.7<br>Al: 9.9<br>$ZrO_2$: 21.5 | $Al_2O_3$: 37.3<br>Al: 19.8<br>$ZrO_2$: 42.9 | 63.5 | 50 | 36 |

TABLE 3-continued

| Example | Batch amounts, g | Weight percent of components | Final weight percent alumina % | Percent final alumina from Al metal | Percent amorphous yield |
|---------|------------------|------------------------------|--------------------------------|-------------------------------------|-------------------------|
| Ex. 8 | Al$_2$O$_3$: 17.0<br>Al: 9.0<br>ZrO$_2$: 24.1 | Al$_2$O$_3$: 33.9<br>Al: 18.0<br>ZrO$_2$: 48.1 | 58.5 | 50 | 63 |

TABLE 4

| Raw Material | Source |
|--------------|--------|
| Alumina particles (Al$_2$O$_3$) | Obtained from Alcoa Industrial Chemicals, Bauxite, AR under the trade designation "A16SG" |
| Aluminum particles (Al) | Obtained from Alfa Aesar, Ward Hill, MA |
| Zirconium particles (ZrO$_2$) | Obtained from Zirconia Sales, Inc. of Marietta, GA under the trade designation "DK-2" |

Example 9 and Comparative Example F

Example 9 and Comparative Example F beads were prepared as described above in Examples 7 and 8 and Comparative Examples D and E, except the amounts of raw material used are listed in Table 5 and the raw material sources are listed in Table 6. A percent amorphous yield was calculated from the resulting flame-formed beads using the same method as that used for Examples 1–6 and Comparative Examples A, B, C. The percent amorphous yield data for Example 9 and Comparative Example F are listed in Table 5 along with the composition information.

The phase composition (glassy/amorphous/crystalline) was determined through Differential Thermal Analysis (DTA). The material was classified as amorphous if the corresponding DTA trace of the material contained an exothermic crystallization event ($T_x$). If the same trace also contained an endothermic event ($T_g$) at a temperature lower than $T_x$ it was considered to consist of a glass phase. If the DTA trace of the material contained no such events, it was considered to contain crystalline phases.

Differential thermal analysis (DTA) was conducted on beads of Example 9 using the following method. A DTA run was made (using an instrument obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample was placed in a 100-microliter Al$_2$O$_3$ sample holder. Each sample was heated in static air at a rate of 10° C./minute from room temperature (about 25° C.) to 1100° C.

The DTA trace of the beads prepared in Example 9 exhibited an endothermic event at a temperature around 894° C., as evidenced by a downward change in the curve of the trace. It is believed this event was due to the glass transition ($T_g$) of the glass material. The same material exhibited an exothermic event at a temperature around 943°

TABLE 5

| Example | Batch amounts, g | Weight percent of components | Final weight percent alumina % | Percent final alumina from Al metal | Percent amorphous yield |
|---------|------------------|------------------------------|--------------------------------|-------------------------------------|-------------------------|
| Comp. F | Al$_2$O$_3$: 33<br>Al: 0.0<br>Y$_2$O$_3$: 17.0 | Al$_2$O$_3$: 66.0<br>Al: 0.0<br>Y$_2$O$_3$: 34 | 66 | 0 | 37 |
| Ex. 9 | Al$_2$O$_3$: 19.5<br>Al: 10.3<br>Y$_2$O$_3$: 20.1 | Al$_2$O$_3$: 39.07<br>Al: 20.67<br>Y$_2$O$_3$: 40.26 | 66 | 50 | 93 |

TABLE 6

| Raw Material | Source |
|--------------|--------|
| Alumina particles (Al$_2$O$_3$) | Obtained from Alcoa Chemicals, under the trade designation "A16SG" |
| Aluminum particles (Al) | Obtained from Alfa Aesar, Ward Hill, MA |
| Yttrium oxide particles (Y$_2$O$_3$) | Obtained from H. C. Stark Newton, MA |

C., as evidenced by a sharp peak in the trace. It is believed that this event was due to the crystallization ($T_x$) of the material. Thus, the material was determined to be glassy.

These glassy beads of Example 9 were crystallized by heat-treating at 1300° C. for 1 hour in an electrically heated furnace. The beads resulting from the heat-treatment were opaque as observed using an optical microscope (prior to heat-treatment, the beads were transparent). The opacity of the heat-treated beads is believed to be a result of the crystallization of the beads. Amorphous materials (including glassy materials) are typically predominantly transparent due to the lack of light scattering centers such as crystal boundaries, while the crystalline particles are opaque due to light scattering effects of the crystal boundaries.

A fraction of crystallized particles were mounted in mounting resin (such as that obtained under the trade designation "TRANSOPTIC POWDER" from Buehler, Lake Bluff, Ill.) in a cylinder of resin about 2.5 cm in diameter and about 1.9 cm high. The mounted section was prepared using conventional polishing techniques using a polisher (such as that obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3, and 1-micrometer slurries. The mounted and polished sample was sputtered with a thin layer of gold-palladium and viewed using a scanning electron microscopy (such as the JEOL SEM Model JSM 840A). The microstructure found in the sample contained no crystals over 200 nanometers as observed in the back-scattered electron (BSE) image mode of the SEM.

Examples 10 and 11 and Comparative Examples G and H

Examples 10 and 11 and Comparative Examples G and H beads were prepared as described in Examples 7 and 8 and Comparative Examples D and E, except the amounts of raw material used are listed in Table 7 and the raw material sources are listed in Table 8. A percent amorphous yield was calculated from the resulting flame-formed beads using the same method as that used for Examples 1–6 and Comparative Examples A, B, C. The percent amorphous yield data for Examples 10 and 11 and Comparative Examples G and H are listed in Table 7 along with the composition information.

TABLE 8

| Raw Material | Source |
|---|---|
| Alumina particles ($Al_2O_3$) | Obtained from Alcoa Industrial Chemicals, Bauxite, AR, under the trade designation "A16SG" |
| Aluminum particles (Al) | Obtained from Alfa Aesar, Ward Hill, MA |
| Magnesium particles (Mg) | Obtained from Alfa Aesar |
| Magnesium oxide particles (MgO) | Obtained from BDH Chemicals Ltd, Poole, England |
| Yttrium oxide particles ($Y_2O_3$) | Obtained from H. C. Stark Newton, MA |

Examples 12

Example 12 beads were prepared as described in Examples 7 and 8 and Comparative Examples D and E, except the amounts of raw material used are listed in Table 9 and the raw material sources are listed in Table 10. A percent amorphous yield was calculated from the resulting flame-formed beads using the same method as that used for Examples 1–6 and Comparative Examples A, B, C. The percent amorphous yield data for Example 12 is listed in Table 9 along with the composition information.

TABLE 7

| Example | Batch amounts, g | Weight percent of components | Final weight percent % Alumina | Final weight percent % Magnesia | Percent final alumina from Al metal | Percent amorphous yield |
|---|---|---|---|---|---|---|
| Comp. G | $Al_2O_3$: 31.4<br>Al: 0.0<br>MgO: 2.5<br>Mg: 0.0<br>$Y_2O_3$: 16.2 | $Al_2O_3$: 62.7<br>Al: 0.0<br>MgO: 5.0<br>Mg: 0.0<br>$Y_2O_3$: 32.3 | 62.7 | 5.0 | 0 | 63 |
| Comp H | $Al_2O_3$: 29.7<br>Al: 0.0<br>MgO: 5.0<br>Mg: 0.0<br>$Y_2O_3$: 15.3 | $Al_2O_3$: 59.4<br>Al: 0.0<br>MgO: 10.0<br>Mg: 0.0<br>$Y_2O_3$: 30.6 | 59.4 | 10.0 | 0 | 61 |
| Ex. 10 | $Al_2O_3$: 18.8<br>Al: 10.0<br>MgO: 0.0<br>Mg: 1.8<br>$Y_2O_3$: 19.4 | $Al_2O_3$: 37.7<br>Al: 19.9<br>MgO: 0.0<br>Mg: 3.6<br>$Y_2O_3$: 38.8 | 62.7 | 5.0 | 50 | 93 |
| Ex. 11 | $Al_2O_3$: 18.1<br>Al: 9.6<br>MgO: 0.0<br>Mg: 3.7<br>$Y_2O_3$: 18.6 | $Al_2O_3$: 36.2<br>Al: 19.2<br>MgO: 0.0<br>Mg: 7.3<br>$Y_2O_3$: 37.3 | 59.4 | 10.0 | 50 | 81 |

TABLE 9

| Example | Batch amounts, g | Weight percent of components | Final weight percent alumina % | Percent final alumina from Al metal | Percent amorphous yield |
|---|---|---|---|---|---|
| Ex. 12 | $Al_2O_3$: 16.7<br>Al: 8.8<br>$Y_2O_3$: 16<br>$ZrO_2$: 8.6 | $Al_2O_3$: 33.3<br>Al: 17.6<br>$Y_2O_3$: 31.9<br>$ZrO_2$: 17.2 | 57.5 | 50 | 93 |

TABLE 10

| Raw Material | Source |
|---|---|
| Alumina particles ($Al_2O_3$) | Obtained from Alcoa Industrial Chemicals, Bauxite, AR, under the trade designation "A16SG" |
| Aluminum particles (Al) | Obtained from Alfa Aesar, Ward Hill, MA |
| Yttrium oxide particles ($Y_2O_3$) | Obtained from H. C. Stark Newton, MA |
| Zirconium oxide particles ($ZrO_2$) | Obtained from Zirconia Sales, Inc. of Marietta, GA under the trade designation "DK-2" |

A DTA trace of the beads prepared in Example 12 was conducted as described in Example 9. The DTA trace exhibited an endothermic event at a temperature around 900° C., as evidenced by a downward change in the curve of the trace. It is believed this event was due to the glass transition ($T_g$) of the glass material. The same material exhibited an exothermic event at a temperature around 935° C., as evidenced by a sharp peak in the trace. It is believed that this event was due to the crystallization ($T_x$) of the material. Thus, the material was determined to be glassy.

The glassy beads prepared in Example 12 were crystallized by heat-treating at 1300° C. for 1 hour in an electrically heated furnace. The beads resulting from the heat-treatment were opaque as observed using an optical microscope (prior to heat-treatment, the beads were transparent). The opacity of the heat-treated beads is believed to be a result of the crystallization of the beads. Amorphous materials (including glassy materials) are typically predominantly transparent due to the lack of light scattering centers such as crystal boundaries, while the crystalline particles are opaque due to light scattering effects of the crystal boundaries.

Example 13

Example 13 beads were prepared as described in Examples 7 and 8 and Comparative Examples D and E, except the amounts of raw materials used are listed in Table 11 and the raw material sources are listed in Table 12. A percent amorphous yield was calculated from the resulting flame-formed beads using the same method as that used for Examples 1–6 and Comparative Examples A, B, C. The percent amorphous yield data for Example 13 is listed in Table 11 along with the composition information.

TABLE 11

| Example | Batch amounts, g | Weight percent of components | Final weight percent alumina % | Percent final alumina from Al metal | Percent amorphous yield |
|---|---|---|---|---|---|
| Ex. 13 | $Al_2O_3$: 10.6<br>Al: 5.6<br>$La_2O_3$: 23.4<br>$ZrO_2$: 10.4 | $Al_2O_3$: 21.2<br>Al: 11.2<br>$La_2O_3$: 46.7<br>$ZrO_2$: 20.9 | 38.5 | 50 | 96 |

TABLE 12

| Raw Material | Source |
|---|---|
| Alumina particles ($Al_2O_3$) | Obtained from Alcoa Industrial Chemicals, Bauxite, AR under the trade designation "A16SG" |
| Aluminum particles (Al) | Obtained from Alfa Aesar, Ward Hill, MA |
| Lanthanum oxide particles ($La_2O_3$) | Obtained from Molycorp Inc., Mountain Pass, CA and calcined at 700° C. for 6 hours prior to batch mixing |
| Zirconium oxide particles ($ZrO_2$) | Obtained from Zirconia Sales, Inc. of Marietta, GA under the trade designation "DK-2" |

A DTA trace of the beads prepared in Example 13 was conducted as described in Example 9. The DTA trace exhibited an endothermic event at a temperature around 880° C., as evidenced by a downward change in the curve of the trace. It is believed this event was due to the glass transition ($T_g$) of the glass material. The same material exhibited an exothermic event at a temperature around 933° C., as evidenced by a sharp peak in the trace. It is believed that this event was due to the crystallization ($T_x$) of the material. Thus, the material was determined to be glassy.

These glassy beads of Example 13 were crystallized by heat-treating at 1300° C. for 45 minutes in an electrically heated furnace. Powder x-ray diffraction, XRD, (using an x-ray diffractometer (obtained under the trade designation "PHILLIPS XRG 3100" from Phillips, Mahwah, N.J.) with copper K α1 radiation of 1.54050 Angstrom) was used to determine the phases present in the crystallized beads. The phases were determined by comparing the peaks present in the XRD trace of the crystallized material to XRD patterns of crystalline phases provided in JCPDS (Joint Committee on Powder Diffraction Standards) databases, published by International Center for Diffraction Data. The resulting crystalline material included $LaAlO_3$, $ZrO_2$ (cubic, tetragonal), $LaAl_{11}O_{18}$, and transitional $Al_2O_3$ phases.

About 25 grams of the glassy beads of Example 13 were placed in a graphite die and hot-pressed using a uniaxial pressing apparatus (obtained under the trade designation "HP-50", Thermal Technology Inc., Brea, Calif.). The hot pressing was carried out in an argon atmosphere and 13.8 megapascals (MPa) (2000 pounds per square inch or 2 ksi) pressure. The hot pressing furnace was ramped up to 970° C. at 25° C./minute. The resulting transparent disk, approximately 34 millimeters (mm) in diameter and 6 mm in thickness, was crushed by using a "Chipmunk" jaw crusher (Type VD, manufactured by BICO Inc., Burbank, Calif.) into abrasive particles and graded to retain the −30+35 fraction (i.e., the fraction collected between 600-micrometer opening size and 500-micrometer opening size screens) and the −35+40 mesh fraction (i.e., the fraction collected 500-micrometer opening size and 425-micrometer opening size screens).

The graded abrasive particles were crystallized by heat-treating at 1300° C. for 45 minutes in an electrically heated furnace. The resulting particles were opaque/crystalline as determined by visual and optical microscopic observation.

A fraction of crystallized particles were mounted in mounting resin as described in Example 9 and Comparative Example F. The microstructure found in the sample contained no crystals over 200 nanometers as observed in the BSE image mode of the SEM.

Example 14–17

Example 14–17 beads were prepared as described in Examples 7 and 8 and Comparative Examples D and E, except the amounts of raw material used are listed in Table 13 and the raw material sources are listed in Table 14. A percent amorphous yield was calculated from the resulting flame-formed beads using the same method as that used for Examples 1–6 and Comparative Examples A, B, C. The percent amorphous yield data for Examples 14–17 are listed in Table 13 along with the composition information.

TABLE 14

| Raw Material | Source |
| --- | --- |
| Alumina particles ($Al_2O_3$) | Obtained from Alcoa Industrial Chemicals, Bauxite, AR, under the trade designation "A16SG" |
| Aluminum particles (Al) | Obtained from Alfa Aesar, Ward Hill, MA |
| Lanthanum oxide particles ($La_2O_3$) | Obtained from Molycorp Inc., Mountain Pass, CA and calcined at 700° C. for 6 hours prior to batch mixing |
| Titanium oxide powder ($TiO_2$) | Obtained from Kemira, Savannah, GA, under the trade designation "UNITANE 0-110" |
| Zirconium oxide particles ($ZrO_2$) | Obtained from Zirconia Sales, Inc. of Marietta, GA under the trade designation "DK-2" |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making amorphous material comprising at least 35 percent by weight $Al_2O_3$, based on the total weight of the amorphous material, the method comprising:
    melting
    (a) particulate, metallic material comprising at least one of a metal, M, that has a negative enthalpy of oxide formation or an alloy thereof; and
    (b) at least one of:
        (i) a M oxide and a source of metal oxide other than the M oxide; or
        (ii) a complex metal oxide comprising M oxide
    to provide a melt, wherein at least a portion of the metal, M, in the melt is oxidized, and wherein at least one of the M oxide, the metal oxide other than the M oxide, or the complex metal oxide comprises $Al_2O_3$; and
    cooling the melt to provide the amorphous material.

2. A method for making amorphous material comprising at least 35 percent by weight $Al_2O_3$, based on the total weight of the amorphous material, the method comprising:
    melting
    (a) particulate, metallic material comprising Al or an alloy thereof; and

TABLE 13

| Example | Batch amounts, g | Weight percent of components | Final weight percent alumina % | Percent final alumina from Al metal | Percent amorphous yield |
| --- | --- | --- | --- | --- | --- |
| Ex. 14 | $Al_2O_3$: 15.5<br>Al: 8.2<br>$ZrO_2$: 22.0<br>$TiO_2$: 4.3 | $Al_2O_3$: 31.0<br>Al: 16.4<br>$ZrO_2$: 44.0<br>$TiO_2$: 8.6 | 54 | 50 | 79 |
| Ex. 15 | $Al_2O_3$: 12.3<br>Al: 6.5<br>$ZrO_2$: 17.4<br>$La_2O_3$: 13.8 | $Al_2O_3$: 24.5<br>Al: 13.0<br>$ZrO_2$: 34.8<br>$La_2O_3$: 27.7 | 44 | 50 | 94 |
| Ex. 16 | $Al_2O_3$: 9.1<br>Al: 4.8<br>$ZrO_2$: 13.0<br>$La_2O_3$: 23.1 | $Al_2O_3$: 18.2<br>Al: 9.6<br>$ZrO_2$: 25.9<br>$La_2O_3$: 46.2 | 34 | 50 | 96 |
| Ex. 17 | $Al_2O_3$: 7.5<br>Al: 4.0<br>$ZrO_2$: 17.0<br>$La_2O_3$: 21.4 | $Al_2O_3$: 15.0<br>Al: 8.0<br>$ZrO_2$: 34.0<br>$La_2O_3$: 42.8 | 28 | 50 | 93 |

(b) at least one of:
  (i) an Al oxide and a source of metal oxide other than the Al oxide; or
  (ii) a complex metal oxide comprising Al oxide to provide a melt, wherein at least a portion of Al in the melt is oxidized; and cooling the melt to provide the amorphous material.

3. The method according to claim 2 wherein the amorphous material is glass.

4. The method according to claim 3 wherein the glass comprises 60 to 70 percent by weight $Al_2O_3$, based on the total weight of the glass.

5. The method according to claim 3 wherein the complex metal oxide comprising M oxide is a complex $Al_2O_3$.metal oxide.

6. The method according to claim 3 wherein each of the melt and the glass comprises $Al_2O_3$, $Y_2O_3$, and at least one of $ZrO_2$ or $HfO_2$, wherein at least 80 percent by weight of the melt and the glass, respectively, collectively comprises the $Al_2O_3$, $Y_2O_3$, and at least one of $ZrO_2$ or $HfO_2$, based on the total weight of the melt and the glass, respectively.

7. The method according to claim 3 wherein each of the melt and the glass comprises $Al_2O_3$, REO, and at least one of $ZrO_2$ or $HfO_2$, wherein at least 80 percent by weight of the melt and the glass, respectively, collectively comprises the $Al_2O_3$, REO, and at least one of $ZrO_2$ or $HfO_2$, based on the total weight of the melt and the glass, respectively.

8. The method according to claim 3 wherein each of the melt and the glass comprises $Al_2O_3$, REO, $Y_2O_3$, and at least one of $ZrO_2$ or $HfO_2$, wherein at least 80 percent by weight of the melt and the glass, respectively, collectively comprises the $Al_2O_3$, REO, $Y_2O_3$, and at least one of $ZrO_2$ or $HfO_2$, based on the total weight of the melt and the glass, respectively.

9. The method according to claim 3 wherein each of the melt and the glass comprises $Al_2O_3$, REO, and at least one of $ZrO_2$ or $HfO_2$, wherein at least 60 percent by weight of the melt and glass, respectively, collectively comprise the $Al_2O_3$, REO, and at least one of $ZrO_2$, or $HfO_2$, and less than 20 percent by weight $SiO_2$, and less than 20 percent by weight $B_2O_3$, based on the total weight of the melt and the glass, respectively.

10. The method according to claim 3 wherein each of the melt and the glass comprises $Al_2O_3$, $Y_2O_3$, and at least one of $ZrO_2$ or $HfO_2$, wherein at least 60 percent by weight of the melt and glass, respectively, collectively comprise the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the melt and the glass, respectively.

11. The method according to claim 3 wherein each of the melt and the glass comprises $Al_2O_3$, REO, and at least one of $ZrO_2$ or $HfO_2$, wherein at least 60 percent by weight of the melt and the glass, respectively, collectively comprise the $Al_2O_3$, REO, and at least one of $ZrO_2$ or $HfO_2$, and less than 40 percent by weight collectively $SiO_2$, $B_2O_3$, and $P_2O_5$, based on the total weight of the melt and the glass, respectively.

12. The method according to claim 3 wherein each of the melt and the glass comprises $Al_2O_3$, $Y_2O_3$, and at least one of $ZrO_2$ or $HfO_2$, wherein at least 60 percent by weight of the melt and the glass, respectively, collectively comprise the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the melt and the glass, respectively.

13. A method for making ceramic comprising glass, the glass comprising at least 35 percent by weight $Al_2O_3$, based on the weight of the glass, the method comprising:
  melting
    (a) particulate, metallic material comprising at least one of a metal, M, that has a negative enthalpy of oxide formation or an alloy thereof; and
    (b) at least one of:
      (i) a M oxide and a source of metal oxide other than the M oxide; or
      (ii) a complex metal oxide comprising M oxide
  to provide a melt, wherein at least a portion of the metal, M, in the melt is oxidized, and wherein at least one of the M oxide, the metal oxide other than the M oxide, or the complex metal oxide comprises $Al_2O_3$; and
  cooling the melt to provide the ceramic, wherein at least a portion of the melt provides the glass.

14. A method for making ceramic comprising glass, the glass comprising at least 35 percent by weight $Al_2O_3$, based on the total weight of the glass, the method comprising:
  melting
    (a) particulate, metallic material comprising Al or an alloy thereof; and
    (b) at least one of:
      (i) an Al oxide and a source of metal oxide other than the Al oxide; or
      (ii) a complex metal oxide comprising Al
  to provide a melt, wherein at least a portion of Al in the melt is oxidized; and
  cooling the melt to provide the ceramic, wherein at least a portion of the melt provides the glass.

15. A method for making an article comprising glass comprising $Al_2O_3$, the method comprising:
  melting
    (a) particulate, metallic material comprising at least one of a metal, M, that has a negative enthalpy of oxide formation or an alloy thereof; and
    (b) at least one of:
      (i) a M oxide and a source of metal oxide other than the M oxide; or
      (ii) a complex metal oxide comprising M oxide,
  to provide a melt, wherein at least a portion of the metal, M, in the melt is oxidized, and wherein at least one of the M oxide, the metal oxide other than the M oxide, or the complex metal oxide comprising M oxide comprises $Al_2O_3$;
  cooling the melt to provide glass particles, the glass having a $T_g$;
  heating the glass particles above the $T_g$ such that the glass particles coalesce to form a shape; and
  cooling the shape to provide the article.

16. A method for making an article comprising glass, the method comprising:
  melting
    (a) particulate, metallic material comprising Al or an alloy thereof; and
    (b) at least one of:
      (i) an Al oxide and a source of metal oxide other than the Al oxide; or
      (ii) a complex metal oxide comprising Al
  to provide a melt, wherein at least a portion of Al in the melt is oxidized;
  cooling the melt to provide glass particles, the glass having a $T_g$;
  heating the glass particles above the $T_g$ such that the glass particles coalesce to form a shape; and
  cooling the shape to provide the article.

17. A method for making an article comprising glass comprising $Al_2O_3$, the method comprising:
melting
  (a) particulate, metallic material comprising at least one of a metal, M, that has a negative enthalpy of oxide formation or an alloy thereof; and
  (b) at least one of:
    (i) a M oxide and a source of metal oxide other than the M oxide; or
    (ii) a complex metal oxide comprising M oxide,
to provide a melt, wherein at least a portion of the metal, M, in the melt is oxidized, and wherein at least one of the M oxide, the metal oxide other than the M oxide, or the complex metal oxide comprising M oxide comprises $Al_2O_3$;
  cooling the melt to provide glass beads, the glass having a $T_g$;
  crushing the glass beads to provide glass particles;
  heating the glass particles above the $T_g$ such that the glass particles coalesce to form a shape; and
  cooling the shape to provide the article.

18. A method for making an article comprising glass, the method comprising:
melting
  (a) particulate, metallic material comprising Al or an alloy thereof; and
  (b) at least one of:
    (i) an Al oxide and a source of metal oxide other than the Al oxide; or
    (ii) a complex metal oxide comprising Al
to provide a melt, wherein at least a portion of Al in the melt is oxidized;
  cooling the melt to provide glass beads, the glass having a $T_g$;
  crushing the glass beads to provide glass particles;
  heating the glass particles above the $T_g$ such that the glass particles coalesce to form a shape; and
  cooling the shape to provide the article.

19. A method for making glass-ceramic comprising at least 35 percent by weight $Al_2O_3$, based on the total weight of the glass-ceramic the method comprising:
melting
  (a) particulate, metallic material comprising at least one of a metal, M, that has a negative enthalpy of oxide formation or an alloy thereof; and
  (b) at least one of:
    (i) a M oxide and a source of metal oxide other than the M oxide; or
    (ii) a complex metal oxide comprising M oxide,
to provide a melt, wherein at least a portion of the metal, M, in the melt is oxidized, and wherein at least one of the M oxide, the metal oxide other than the M oxide, or the complex metal oxide comprising M oxide comprises $Al_2O_3$;
  cooling the melt to provide amorphous material; and
  heat-treating the amorphous material to convert at least a portion of the amorphous material to the glass-ceramic.

20. A method for making glass-ceramic comprising at least 35 percent by weight $Al_2O_3$, based on the total weight of the glass-ceramic the method comprising:
melting
  (a) particulate, metallic material comprising Al or an alloy thereof; and
  (b) at least one of:
    (i) an Al oxide and a source of metal oxide other than the Al oxide; or
    (ii) a complex metal oxide comprising Al oxide
to provide a melt, wherein at least a portion of Al in the melt is oxidized;
  cooling the melt to provide amorphous material; and
  heat-treating the amorphous material to at least a portion of the amorphous material to the glass-ceramic.

21. The method according to claim 20 wherein the amorphous material is glass.

22. The method according to claim 21 wherein the glass comprises 60 to 70 percent by weight $Al_2O_3$, based on the total weight of the glass.

23. The method according to claim 21 wherein the complex metal oxide comprising M oxide is a complex $Al_2O_3$.metal oxide.

24. The method according to claim 21 wherein each of the melt and the glass comprises $Al_2O_3$, $Y_2O_3$, and at least one of $ZrO_2$ or $HfO_2$, wherein at least 80 percent by weight of the melt and the glass, respectively, collectively comprises the $Al_2O_3$, $Y_2O_3$, and at least one of $ZrO_2$ or $HfO_2$, based on the total weight of the melt and the glass, respectively.

25. The method according to claim 21 wherein each of the melt and the glass comprises $Al_2O_3$, REO, and at least one of $ZrO_2$ or $HfO_2$, wherein at least 80 percent by weight of the melt and the glass, respectively, collectively comprises the $Al_2O_3$, REO, and at least one of $ZrO_2$ or $HfO_2$, based on the total weight of the melt and the glass, respectively.

26. The method according to claim 21 wherein each of the melt and the glass comprises $Al_2O_3$, REO, $Y_2O_3$, and at least one of $ZrO_2$ or $HfO_2$, wherein at least 80 percent by weight of the melt and the glass, respectively, collectively comprises the $Al_2O_3$, REO, $Y_2O_3$, and at least one of $ZrO_2$ or $HfO_2$, based on the total weight of the melt and the glass, respectively.

27. The method according to claim 21 wherein each of the melt and the glass comprises $Al_2O_3$, REO, and at least one of $ZrO_2$ or $HfO_2$, wherein at least 60 percent by weight of the melt and glass, respectively, collectively comprise the $Al_2O_3$, REO, and at least one of $ZrO_2$ or $HfO_2$, and less than 20 percent by weight $SiO_2$ and less than 20 percent by weight $B_2O_3$, based on the total weight of the melt and the glass, respectively.

28. The method according to claim 21 wherein each of the melt and the glass comprises $Al_2O_3$, $Y_2O_3$, and at least one of $ZrO_2$ or $HfO_2$, wherein at least 60 percent by weight of the melt and glass, respectively, collectively comprise the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the melt and the glass, respectively.

29. The method according to claim 21 wherein each of the melt and the glass comprises $Al_2O_3$, REO, and at least one of $ZrO_2$ or $HfO_2$, wherein at least 60 percent by weight of the melt and the glass, respectively, collectively comprise the $Al_2O_3$, REO, and at least one of $ZrO_2$ or $HfO_2$, and less than 40 percent by weight collectively $SiO_2$, $B_2O_3$, and $P_2O_5$, based on the total weight of the melt and the glass, respectively.

30. The method according to claim 21 wherein each of the melt and the glass comprises $Al_2O_3$, $Y_2O_3$, and at least one of $ZrO_2$ or $HfO_2$, wherein at least 60 percent by weight of the melt and the glass, respectively, collectively comprise the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the melt and the glass, respectively.

31. A method for making a glass-ceramic article comprising $Al_2O_3$, the method comprising:
melting
(a) particulate, metallic material comprising at least one of a metal, M, that has a negative enthalpy of oxide formation or an alloy thereof; and
(b) at least one of:
(i) a M oxide and a source of metal oxide other than the M oxide; or
(ii) a complex metal oxide comprising M oxide,
to provide a melt, wherein at least a portion of the metal, M, in the melt is oxidized, and wherein at least one of the M oxide, the metal oxide other than the M oxide, or the complex metal oxide comprising M oxide comprises $Al_2O_3$;
cooling the melt to provide glass;
crushing glass to provide glass particles, the glass having a $T_g$;
heating the glass particles above the $T_g$ such that the glass particles coalesce to form a shape;
cooling the shape to provide a glass article; and
heat-treating the glass article to provide a glass-ceramic article.

32. A method for making a glass-ceramic article, the method comprising:
melting
(a) particulate, metallic material comprising Al or an alloy thereof; and
(b) at least one of:
(i) an Al oxide and a source of metal oxide other than the Al oxide; or
(ii) a complex metal oxide comprising Al
to provide a melt, wherein at least a portion of Al in the melt is oxidized;
cooling the melt to provide glass;
crushing glass to provide glass particles, the glass having a $T_g$;
heating the glass particles above the $T_g$ such that the glass particles coalesce to form a shape;
cooling the shape to provide a glass article; and
heat-treating the glass article to provide a glass-ceramic article.

33. A method for making abrasive particles comprising $Al_2O_3$, the method comprising:
melting
(a) particulate, metallic material comprising at least one of a metal, M, that has a negative enthalpy of oxide formation or an alloy thereof; and
(b) at least one of:
(i) a M oxide and a source of metal oxide other than the M oxide; or
(ii) a complex metal oxide comprising M oxide,
to provide a melt, wherein at least a portion of the metal, M, in the melt is oxidized, and wherein at least one of the M oxide, the metal oxide other than the M oxide, or the complex metal oxide comprising M oxide comprises $Al_2O_3$;
cooling the melt to provide amorphous material;
crushing the amorphous material to provide amorphous particles; and
heat-treating the particles such that at least a portion of the amorphous material is converted to glass-ceramic to provide abrasive particles comprising glass-ceramic, the glass-ceramic comprising at least 35 percent by weight $Al_2O_3$, based on the total weight of the glass-ceramic.

34. A method for making abrasive particles, the method comprising:
melting
(a) particulate, metallic material comprising Al or an alloy thereof: and
(b) at least one of:
(i) an Al oxide and a source of metal oxide other than the Al oxide; or
(ii) a complex metal oxide comprising Al oxide
to provide a melt, wherein at least a portion of Al in the melt is oxidized;
cooling the melt to provide amorphous material;
crushing the amorphous material to provide amorphous particles; and
heat-treating the particles such that at least a portion of the amorphous material is converted to glass-ceramic to provide abrasive particles comprising glass-ceramic, the glass ceramic comprising at least 35 percent by weight $Al_2O_3$, based on the total weight of the glass-ceramic.

35. A method for making abrasive particles comprising $Al_2O_3$, the method comprising:
melting
(a) particulate, metallic material comprising at least one of a metal, M, that has a negative enthalpy of oxide formation or an alloy thereof; and
(b) at least one of:
(i) a M oxide and a source of metal oxide other than the M oxide; or
(ii) a complex metal oxide comprising M oxide,
to provide a melt, wherein at least a portion of the metal, M, in the melt is oxidized, and wherein at least one of the M oxide, the metal oxide other than the M oxide, or the complex metal oxide comprising M oxide comprises $Al_2O_3$;
converting the melt into particles comprising amorphous material, wherein the converting includes cooling the melt to provide the amorphous material; and
heat-treating the amorphous material to convert at least a portion of the amorphous material to glass-ceramic to provide abrasive particles comprising glass-ceramic, the glass-ceramic comprising at least 35 percent by weight $Al_2O_3$, based on the total weight of the glass-ceramic.

36. A method for making abrasive particles comprising $Al_2O_3$, the method comprising:
melting
(a) particulate, metallic material comprising Al or an alloy thereof; and
(b) at least one of:
(i) an Al oxide and a source of metal oxide other than the Al oxide; or
(ii) a complex metal oxide comprising Al oxide
to provide a melt, wherein at least a portion of Al in the melt is oxidized;
converting the melt into particles comprising amorphous material, wherein the converting includes cooling the melt to provide the amorphous material; and
heat-treating the amorphous material to convert at least a portion of the amorphous material to glass-ceramics and provide abrasive particles comprising glass-ceramic, the glass-ceramic comprising at least 35 percent by weight $Al_2O_3$, based on the total weight of the glass-ceramic.

37. The method according to claim 15, wherein the glass comprises at least 35 percent by weight of the $Al_2O_3$, based on the total weight of the glass.

38. The method according to claim 15, wherein the melting includes flame melting.

39. The method according to claim 16, wherein the glass comprises at least 35 percent by weight of the $Al_2O_3$, based on the total weight of the glass.

40. The method according to claim 16, wherein the melting includes flame melting.

41. The method according to claim 17, wherein the glass comprises at least 35 percent by weight of the $Al_2O_3$, based on the total weight of the glass.

42. The method according to claim 17, wherein the melting includes flame melting.

43. The method according to claim 18, wherein the glass comprises at least 35 percent by weight of the $Al_2O_3$, based on the total weight of the glass.

44. The method according to claim 18, wherein the melting includes flame melting.

45. The method according to claim 31, wherein the glass-ceramic article comprises at least 35 percent by weight of the $Al_2O_3$, based on the total weight of the glass.

46. The method according to claim 31, wherein the melting includes flame melting.

47. The method according to claim 32, wherein the glass-ceramic article comprises at least 35 percent by weight of the $Al_2O_3$, based on the total weight of the glass.

48. The method according to claim 32, wherein the melting includes flame melting.

49. A method of making amorphous material comprising $Al_2O_3$, the method comprising:
flame melting
(a) particulate, metallic material comprising at least one of a metal, M, that has a negative enthalpy of oxide formation or an alloy thereof; and
(b) at least one of:
(i) a M oxide and a source of metal oxide other than the M oxide; or
(ii) a complex metal oxide comprising M oxide
to provide a melt, wherein at least a portion of the metal, M, in the melt is oxidized, and wherein at least one of the M oxide, the metal oxide other than the M oxide, or the complex metal oxide comprises $Al_2O_3$; and
cooling the melt to provide the amorphous material.

50. The method according to claim 49 wherein M is at least Al.

51. The method according to claim 50 wherein the amorphous material is glass.

52. The method according to claim 51, wherein each of the melt and the glass comprises $Al_2O_3$, REO, $Y_2O_3$, and at least one of $ZrO_2$ or $HfO_2$, wherein at least 80 percent by weight of the melt and the glass, respectively, collectively comprises the $Al_2O_3$, REO, $Y_2O_3$, and at least one of $ZrO_2$ or $HfO_2$, based on the total weight of the melt and the glass, respectively.

53. A method of making ceramic comprising glass comprising $Al_2O_3$, the method comprising:
flame melting
(a) particulate, metallic material comprising at least one of a metal, M, that has a negative enthalpy of oxide formation or an alloy thereof; and
(b) at least one of:
(i) a M oxide and a source of metal oxide other than the M oxide; or
(ii) a complex metal oxide comprising M oxide
to provide a melt, wherein at least a portion of the metal, M, in the melt is oxidized, and wherein at least one of the M oxide, the metal oxide other than the M oxide, or the complex metal oxide comprises $Al_2O_3$; and
cooling the melt to provide the ceramic, wherein at least a portion of the melt provides the glass.

54. The method according to claim 53 wherein M is at least Al.

55. A method of making glass-ceramic comprising glass comprising $Al_2O_3$, the method comprising:
melting
(a) particulate, metallic material comprising at least one of a metal, M, that has a negative enthalpy of oxide formation or an alloy thereof; and
(b) at least one of:
(i) a M oxide and a source of metal oxide other than the M oxide; or
(ii) a complex metal oxide comprising M oxide
to provide a melt, wherein at least a portion of the metal, M, in the melt is oxidized, and wherein at least one of the M oxide, the metal oxide other than the M oxide, or the complex metal oxide comprises M oxide comprises $Al_2O_3$; and
cooling the melt to provide amorphous material; and
heat-treating the amorphous material to convert at least a portion of the amorphous material to glass-ceramic.

56. The method according to claim 55 wherein M is at least Al.

57. The method according to claim 56 wherein the amorphous material is glass.

58. The method according to claim 57 wherein each of the melt and the glass comprises $Al_2O_3$, REO, $Y_2O_3$, and at least one of ZrO or $HfO_2$, wherein at least 80 percent by weight of the melt and the glass, respectively, collectively comprises the $Al_2O_3$, REO, $Y_2O_3$, and at least one of $ZrO_2$ or $HfO_2$, based on the total weight of the melt and the glass, respectively.

59. A method for making particles comprising $Al_2O_3$, the method comprising:
flame melting
(a) particulate, metallic material comprising at least one of a metal, M, that has a negative enthalpy of oxide formation or an alloy thereof; and
(b) at least one of:
(i) a M oxide and a source of metal oxide other than the M oxide; or
(ii) a complex metal oxide comprising M oxide
to provide a melt, wherein at least a portion of the metal, M, in the melt is oxidized, and wherein at least one of the M oxide, the metal oxide other than the M oxide, or the complex metal oxide comprises M oxide comprises $Al_2O_3$;
cooling the melt to provide amorphous material;
crushing the amorphous material to provide amorphous particles; and
heat-treating the particles such that at a portion of the amorphous material is converted to glass-ceramic to provide abrasive particles comprising glass-ceramic.

60. The method according to claim 59, wherein M is at least Al.

61. A method for making abrasive particles comprising $Al_2O_3$, the method comprising:

flame melting
- (a) particulate, metallic material comprising at least one of a metal, M, that has a negative enthalpy of oxide formation or an alloy thereof; and
- (b) at least one of:
  - (i) a M oxide and a source of metal oxide other than the M oxide; or
  - (ii) a complex metal oxide comprising M oxide to provide a melt, wherein at least a portion of the metal, M, in the melt is oxidized, and wherein at least one of the M oxide, the metal oxide other than the M oxide, or the complex metal oxide comprising M oxide comprises $Al_2O_3$;

converting the melt into particles comprising amorphous material, wherein the converting includes cooling the melt to provide the amorphous material; and heat-treating the amorphous material to convert at least a portion of the amorphous material to glass-ceramic and provide abrasive particles comprising the glass-ceramic.

62. The method according to claim 61, wherein M is at least Al.

* * * * *

UNITED STATES PATENT AND TRADEMARK OFFICE
CERTIFICATE OF CORRECTION

PATENT NO. : 7,168,267 B2
APPLICATION NO. : 10/211639
DATED : January 30, 2007
INVENTOR(S) : Anatoly Z. Rosenflanz It is certified that error appears in the above-identified patent and that said Letters Patent is hereby corrected as shown below:

On the First Page, in Column 1, under (Related U.S. Application Data)
Line 1, delete "09/992,526," and insert -- 09/922,526, --, therefor.
Line 3, delete "09/992,527," and insert -- 09/922,527, --, therefor.

Column 3
Line 11, after "example" delete "1f and insert -- if --, therefor.

Column 8
Line 52, delete "30 35," and insert -- 30, 35, --, therefor.
Line 61, delete "feast" and insert -- least --, therefor.

Column 9
Line 8, delete "30 35," and insert -- 30, 35, --, therefor.

Column 10
Line 25, delete "SiO2" and insert -- $SiO_2$ --, therefor.

Column 11
Line 5, delete "SiO2," and insert -- $SiO_2$, --, therefor.

Column 13
Lines 34-35, delete "stiochiometry" and insert -- stoichiometry --, therefor.
Line 66, delete "oxide other" and insert -- oxide·other --, therefor.

Column 18
Line 67, delete "ReAlO$_3$" and insert -- $ReAlO_3$ --, therefor.

Column 19
Line 32, delete "ReA$_{11}$O$_{18}$" and insert -- $ReAl_{11}O_{18}$ --, therefor.
Line 33, delete "Y$_3$Al5O$_{12}$)," and insert -- $Y_3Al_5O_{12}$), --, therefor.
Line 35, after "thereof" insert -- . --.
Line 47, delete "Ho;" and insert -- Ho, --, therefor.

Column 20
Lines 24-25, after "determine" insert -- the average crystal size as follows. The number of crystals that intersect per unit length ($N_L$) of a random straight line drawn across the micrograph are counted. The average crystal size is determined from this number using the following equation. --, as a continuation of paragraph.

UNITED STATES PATENT AND TRADEMARK OFFICE
CERTIFICATE OF CORRECTION

PATENT NO. : 7,168,267 B2
APPLICATION NO. : 10/211639
DATED : January 30, 2007
INVENTOR(S) : Anatoly Z. Rosenflanz It is certified that error appears in the above-identified patent and that said Letters Patent is hereby corrected as shown below:

Column 21
Line 17, after "wherein" delete "for".
Lines 19-21, delete "$ZrO_2$, at least 75 (in some embodiments preferably, 80, 85, 90, 95, or even 100) percent by number of the crystal sizes thereof are not greater than 200 nanometers." and insert -- $ZrO_2$ has an average crystal size not greater than 150 nanometers. In some embodiments preferably, the glass-ceramics further comprise a second, different complex $Al_2O_3 \cdot Y_2O_3$. --, therefor.
Line 29, delete "80 85," and insert -- 80, 85, --, therefor.

Column 22
Line 50, delete "10/211/628;" and insert -- 10/211,628; --, therefor.

Column 23
Line 46, delete "JIS1500 ," and insert -- JIS1500, --, therefor. (Consider Space)

Column 26
Line 47, delete "tetrafluoroboate," and insert -- tetrafluoroborate, --, therefor.

Column 27
Line 11, delete "andlor" and insert -- and/or --, therefor.

Column 28
Line 48, delete "(CuIler" and insert -- (Culler --, therefor.

Column 30
Line 20, delete "((212" and insert -- (212 --, therefor.

Column 41
Line 40, in Claim 9, delete "$ZrO_2$," and insert -- $ZrO_2$ --, therefor.
Line 41, in Claim 9, delete "$SiO_2$," and insert -- $SiO_2$ --, therefor.

Column 42
Line 3, in Claim 13, after "on the" insert -- total --.

Column 43
Line 58, in Claim 20, after "glass-ceramic" insert -- , --.

UNITED STATES PATENT AND TRADEMARK OFFICE
CERTIFICATE OF CORRECTION

PATENT NO. : 7,168,267 B2
APPLICATION NO. : 10/211639
DATED : January 30, 2007
INVENTOR(S) : Anatoly Z. Rosenflanz It is certified that error appears in the above-identified patent and that said Letters Patent is hereby corrected as shown below:

<u>Column 44</u>
Line 2, in Claim 20, after "to" insert -- convert --.

<u>Column 46</u>
Line 19, in Claim 34, delete "glass ceramic" and insert -- glass-ceramic --, therefor.
Line 42, in Claim 35, after "glass-ceramic" delete "to" and insert -- and --, therefor.

<u>Column 48</u>
Line 39, in Claim 58, delete "ZrO" and insert -- $ZrO_2$ --, therefor.
Line 44, in Claim 59, delete "$Al_2O_3$,the" and insert -- $Al_2O_3$, the --, therefor.
    (Consider space)

Signed and Sealed this

Sixteenth Day of June, 2009

JOHN DOLL
*Acting Director of the United States Patent and Trademark Office*